US010454936B2

(12) United States Patent
Koottayi et al.

(10) Patent No.: US 10,454,936 B2
(45) Date of Patent: Oct. 22, 2019

(54) ACCESS MANAGER SESSION MANAGEMENT STRATEGY

(71) Applicant: Oracle International Corporation, Redwood Shores, CA (US)

(72) Inventors: Vipin Anaparakkal Koottayi, Trikarpur (IN); Stephen Mathew, Bangalore (IN); Madhu Martin, Bangalore (IN)

(73) Assignee: Oracle International Corporation, Redwood Shores, CA (US)

( * ) Notice: Subject to any disclaimer, the term of this patent is extended or adjusted under 35 U.S.C. 154(b) by 351 days.

(21) Appl. No.: 15/331,613

(22) Filed: Oct. 21, 2016

(65) Prior Publication Data

US 2017/0118218 A1  Apr. 27, 2017

Related U.S. Application Data

(60) Provisional application No. 62/245,529, filed on Oct. 23, 2015.

(51) Int. Cl.
*G06F 17/30* (2006.01)
*H04L 29/06* (2006.01)

(52) U.S. Cl.
CPC ........ *H04L 63/101* (2013.01); *H04L 63/0876* (2013.01)

(58) Field of Classification Search
CPC ........ G06F 21/31; G06F 21/44; G06F 21/604; H04L 67/146; H04L 67/14
USPC .......................................................... 726/4
See application file for complete search history.

(56) References Cited

U.S. PATENT DOCUMENTS

| 6,041,357 A | 3/2000 | Kunzelman et al. |
| 6,055,637 A | 4/2000 | Hudson et al. |
| 6,076,108 A | 6/2000 | Courts et al. |
| 6,178,511 B1 | 1/2001 | Cohen et al. |

(Continued)

FOREIGN PATENT DOCUMENTS

| EP | 1864240 | 12/2007 |
| WO | 2013049461 | 4/2013 |
| WO | 2015042546 | 3/2015 |
| WO | 2015042547 | 3/2015 |
| WO | WO2016051240 | 4/2016 |

OTHER PUBLICATIONS

Maruyama et al, Dynamic Route Selection Algorithms for Session Based Communication Networks, 1983, ACM, pp. 162-169.*

(Continued)

*Primary Examiner* — Luu T Pham
*Assistant Examiner* — Jenise E Jackson
(74) *Attorney, Agent, or Firm* — Kilpatrick Townsend & Stockton LLP

(57) ABSTRACT

Techniques are disclosed for managing session information stored by an access management system. Certain techniques are disclosed for updating session information based characteristics of the session information to be updated. The disclose techniques disclose how session information is updated and the frequency in which the session information is updated. Certain embodiments may enable a decrease in computing performance overhead and/or memory usage overhead caused by managing session information (e.g., performing authentication or determining authorization to access a resource) for a session.

11 Claims, 7 Drawing Sheets

(56) References Cited

U.S. PATENT DOCUMENTS

| | | | |
|---|---|---|---|
| 6,338,064 B1 | 1/2002 | Ault et al. |
| 6,385,724 B1 | 5/2002 | Beckman et al. |
| 6,430,619 B1 | 8/2002 | Sitaraman et al. |
| 6,811,873 B2 | 11/2004 | Nadkarni |
| 7,100,195 B1 | 8/2006 | Underwood |
| 7,137,006 B1 | 11/2006 | Grandcolas et al. |
| 7,225,256 B2 | 5/2007 | Villavicencio |
| 7,296,290 B2 | 11/2007 | Barriga et al. |
| 7,426,642 B2 | 9/2008 | Aupperle et al. |
| 7,437,594 B1 | 10/2008 | Mount et al. |
| 7,496,953 B2 | 2/2009 | Andreev et al. |
| 7,525,938 B2 | 4/2009 | Hurtta |
| 7,747,746 B2 | 6/2010 | Thayer et al. |
| 7,761,911 B2 | 7/2010 | Song et al. |
| 7,805,529 B2 | 9/2010 | Galluzzo et al. |
| 7,805,757 B2 | 9/2010 | Menten |
| 7,818,582 B2 | 10/2010 | Marion et al. |
| 7,886,000 B1 | 2/2011 | Calone et al. |
| 7,908,380 B1 | 3/2011 | Chu et al. |
| 7,996,376 B2 | 8/2011 | Singh et al. |
| 8,001,232 B1 | 8/2011 | Saulpaughet et al. |
| 8,073,954 B1 | 12/2011 | Tu et al. |
| 8,117,649 B2 | 2/2012 | Hardt |
| 8,244,907 B2 | 8/2012 | Hinton et al. |
| 8,365,266 B2 | 1/2013 | Bogner et al. |
| 8,438,635 B2 | 5/2013 | Das et al. |
| 8,442,943 B2 | 5/2013 | Multer et al. |
| 8,468,586 B2 | 6/2013 | Koottayi et al. |
| 8,495,195 B1 | 7/2013 | Abidogun et al. |
| 8,544,069 B1 | 9/2013 | Subbiah et al. |
| 8,611,873 B2 | 12/2013 | Onyon et al. |
| 8,627,435 B2 | 1/2014 | Sirota et al. |
| 8,627,479 B2 | 1/2014 | Wittenstein et al. |
| 8,650,305 B2 | 2/2014 | Booth et al. |
| 8,719,342 B2 | 5/2014 | Mutikainen et al. |
| 8,738,774 B2 | 5/2014 | Sheng et al. |
| 8,756,704 B2 | 6/2014 | Castellucci et al. |
| 8,819,444 B2 | 8/2014 | Shahbazi et al. |
| 8,843,997 B1 | 9/2014 | Hare |
| 8,898,765 B2 | 11/2014 | Goyal et al. |
| 8,955,037 B2 | 2/2015 | Srinivasan et al. |
| 8,990,909 B2 | 3/2015 | Kelley |
| 9,083,690 B2 | 7/2015 | Subramanya et al. |
| 9,104,451 B2 | 8/2015 | Subramanya et al. |
| 9,124,582 B2 | 9/2015 | Kalinichenko et al. |
| 9,225,744 B1 | 12/2015 | Behm et al. |
| 9,230,003 B2 | 1/2016 | Goetsch |
| 9,240,886 B1 | 1/2016 | Allen et al. |
| 9,247,006 B2 | 1/2016 | Mathew et al. |
| 9,405,887 B2 | 8/2016 | Yin et al. |
| 9,509,684 B1 | 11/2016 | Dixson-Boles et al. |
| 9,544,293 B2 | 1/2017 | Mathew et al. |
| 9,769,147 B2 | 9/2017 | Mathew et al. |
| 9,866,640 B2 | 1/2018 | Motukuru et al. |
| 9,887,981 B2 | 2/2018 | Mathew et al. |
| 10,009,335 B2 | 6/2018 | Mathew et al. |
| 10,084,769 B2 | 9/2018 | Mathew et al. |
| 2002/0029269 A1 | 3/2002 | McCarty et al. |
| 2002/0078365 A1 | 6/2002 | Burnett et al. |
| 2003/0105862 A1 | 6/2003 | Villavicencio |
| 2004/0003259 A1 | 1/2004 | Chang et al. |
| 2004/0073666 A1 | 4/2004 | Foster et al. |
| 2005/0091655 A1 | 4/2005 | Probert et al. |
| 2005/0108570 A1 | 5/2005 | Gopalraj |
| 2005/0120091 A1 | 6/2005 | Casais et al. |
| 2005/0144482 A1 | 6/2005 | Anuszewski et al. |
| 2006/0059546 A1 | 3/2006 | Nester et al. |
| 2006/0218630 A1 | 9/2006 | Pearson et al. |
| 2006/0236382 A1 | 10/2006 | Hinton et al. |
| 2006/0277596 A1 | 12/2006 | Calvert et al. |
| 2007/0089167 A1 | 4/2007 | Villavicencio |
| 2007/0147247 A1 | 6/2007 | Kalonji et al. |
| 2007/0192326 A1 | 8/2007 | Angal et al. |
| 2007/0220154 A1 | 9/2007 | El Husseini et al. |
| 2008/0066159 A1 | 3/2008 | Dillaway et al. |
| 2008/0114883 A1 | 5/2008 | Singh et al. |
| 2008/0294781 A1 | 11/2008 | Hinton et al. |
| 2009/0037581 A1 | 2/2009 | Richardson et al. |
| 2009/0037763 A1 | 2/2009 | Adhya et al. |
| 2009/0047928 A1 | 2/2009 | Utsch et al. |
| 2009/0089437 A1* | 4/2009 | Polozoff ............ H04L 65/1066 709/227 |
| 2009/0132639 A1* | 5/2009 | Yan ........................ H04L 67/14 709/202 |
| 2009/0292927 A1* | 11/2009 | Wenzel .................... G06F 21/41 713/185 |
| 2010/0043062 A1 | 2/2010 | Alexander et al. |
| 2010/0082989 A1 | 4/2010 | Bussard et al. |
| 2010/0131755 A1 | 5/2010 | Zhu et al. |
| 2010/0146611 A1 | 6/2010 | Kuzin et al. |
| 2010/0154043 A1* | 6/2010 | Castellucci ......... G06F 21/6218 726/7 |
| 2010/0290392 A1 | 11/2010 | Rasanen et al. |
| 2011/0185421 A1 | 7/2011 | Wittenstein et al. |
| 2011/0307615 A1 | 12/2011 | Krishnaswamy et al. |
| 2012/0078708 A1 | 3/2012 | Taylor et al. |
| 2012/0106333 A1 | 5/2012 | Lee et al. |
| 2012/0191842 A1 | 7/2012 | Hu et al. |
| 2012/0254949 A1 | 10/2012 | Mikkonen et al. |
| 2012/0254957 A1 | 10/2012 | Fork et al. |
| 2012/0266229 A1 | 10/2012 | Simone et al. |
| 2012/0291090 A1 | 11/2012 | Srinivasan et al. |
| 2013/0036454 A1 | 2/2013 | Purvis et al. |
| 2013/0073670 A1 | 3/2013 | Das et al. |
| 2013/0086651 A1* | 4/2013 | Kavantzas ............ G06F 21/335 726/5 |
| 2013/0086652 A1* | 4/2013 | Kavantzas ............ G06F 21/335 726/5 |
| 2013/0198818 A1 | 8/2013 | Hitchcock et al. |
| 2014/0068702 A1 | 3/2014 | Hyndman et al. |
| 2014/0149280 A1 | 5/2014 | Karkhanis et al. |
| 2014/0344326 A1 | 11/2014 | Kamath et al. |
| 2015/0074407 A1* | 3/2015 | Palmeri ................ H04L 63/0807 713/171 |
| 2015/0082029 A1 | 3/2015 | Volchok |
| 2015/0088978 A1 | 3/2015 | Motukuru et al. |
| 2015/0089569 A1 | 3/2015 | Sondhi et al. |
| 2015/0089570 A1 | 3/2015 | Sondhi et al. |
| 2015/0089571 A1 | 3/2015 | Srinivasan et al. |
| 2015/0089579 A1 | 3/2015 | Manza et al. |
| 2015/0089580 A1 | 3/2015 | Manza et al. |
| 2015/0089596 A1 | 3/2015 | Sondhi et al. |
| 2015/0089597 A1 | 3/2015 | Srinivasan et al. |
| 2015/0089604 A1 | 3/2015 | Mathew et al. |
| 2015/0089614 A1 | 3/2015 | Mathew et al. |
| 2015/0089617 A1 | 3/2015 | Sondhi et al. |
| 2015/0089619 A1 | 3/2015 | Manza et al. |
| 2015/0089620 A1 | 3/2015 | Manza et al. |
| 2015/0089622 A1 | 3/2015 | Sondhi et al. |
| 2015/0089623 A1 | 3/2015 | Sondhi et al. |
| 2015/0220713 A1 | 8/2015 | Beenau et al. |
| 2015/0220926 A1 | 8/2015 | McLachlan et al. |
| 2016/0065570 A1 | 3/2016 | Spencer, III et al. |
| 2016/0219040 A1 | 7/2016 | Mathew et al. |
| 2016/0248758 A1 | 8/2016 | Mathew et al. |
| 2016/0285822 A1* | 9/2016 | Adams .................... H04L 63/02 |
| 2016/0381000 A1 | 12/2016 | Mathew et al. |
| 2017/0034152 A1 | 2/2017 | Subramanya et al. |
| 2017/0085556 A1 | 3/2017 | Mathew et al. |
| 2017/0118222 A1 | 4/2017 | Subramanya et al. |
| 2017/0118249 A1 | 4/2017 | Motukuru et al. |
| 2018/0046794 A1 | 2/2018 | Mathew et al. |
| 2018/0077243 A1 | 3/2018 | Mathew et al. |

OTHER PUBLICATIONS

Heo et al, Statistical SIP Traffic Modeling and Analysis System, 2010, IEEE, pp. 1223-1228.*

Menasce et al, Resource Management Policies for E-commerce Servers, Mar. 2000, ACM, vol. 27, issue 4, pp. 27-35.*

Masumi et al, Toward Practical Use of Virtual Smartphone, 2012, IEEE, pp. 1-5.*

(56) References Cited

OTHER PUBLICATIONS

Maruyama et al, Dynamic Route Selection Algorithms for Session Based Communicaton Networks, Apr. 1983, ACM, vol. 13, issue 2, pp. 162-169.*
Haire, A Solution to SSO Authentication and Identity Management: Lessons Learned, Atlassian Blog, May 16, 2013, 5 pages.
U.S. Appl. No. 14/814,209, Non-Final Office Action dated Jan. 11, 2017, 13 pages.
U.S. Appl. No. 15/005,365, Final Office Action dated Mar. 10, 2017, 12 pages.
U.S. Appl. No. 14/754,222, Notice of Allowance dated May 17, 2017, 5 pages.
U.S. Appl. No. 14/491,076, Notice of Allowance dated Nov. 2, 2017, 11 pages.
U.S. Appl. No. 15/005,365, Notice of Allowance dated Sep. 27, 2017, 16 pages.
U.S. Appl. No. 15/143,240, Final Office Action dated Dec. 15, 2017, 14 pages.
U.S. Appl. No. 15/372,342, Non-Final Office Action dated Oct. 20, 2017, 14 pages.
Dacosta et al., One-Time Cookies: Preventing Session Hijacking Attacks with Stateless Authentication Tokens, ACM Trans. Internet Technol. 12, 1, Article 1, 2012, 31 pages.
Pujolle et al., Secure Session Management With Cookies, 7th International Conference on Information, Communications and Signal Processing (ICICS), 2009, pp. 1-6.
Samar, Single Sign-On Using Cookies for Web Applications, Enabling Technologies: Infrastructure for Collaborative Enterprises, (WET ICE '99) Proceedings. IEEE 8th International Workshops on, Stanford, CA, 1999, pp. 158-163.
Configuring VMware Identity Manager for Multiple Data Centers, Technical White Paper: VMware Identity Manager 2.8, Available Online at https://www.vmware.com/content/dam/digitalmarketing/vmware/en/pdf/techpaper/vmware-identity-manager-multiple-data-center-configuration.pdf, Dec. 2016, 16 pages.
Dual Factor Authentication, Reliance, Oct. 24, 2016, 8 pages.
Multi-Data Center With Session Sharing, IBM Security Access Manager for Web, Version 7.0, Available Online at https://www.ibm.com/support/knowledgecenter/SSPREK_7.0.0/com.ibm.isam.doc_70/ameb_smsdeploy_guide/concept/c_multi_data_center_with_session.html, 2017, 3 pages.
RSA Adaptive Authentication, RSA Security product literature, Available Online at https://www.rsa.com/en-us/products/fraud-prevention/3d-secure-authentication, 2016, 4 pages.
The ABCs of ADCs, White Paper: ABCs of Application Delivery, Available Online at https://www.fortinet.com/content/dam/fortinet/assets/white-papers/FortiADC-ABCs.pdf, 2014, 8 pages.
U.S. Appl. No. 14/814,209, Non-Final Office Action dated May 14, 2018, 20 pages.
U.S. Appl. No. 15/143,240, Notice of Allowance dated May 24, 2018, 15 pages.
U.S. Appl. No. 15/372,342, Notice of Allowance dated Mar. 13, 2018, 12 pages.
U.S. Appl. No. 15/782,700, Non-Final Office Action dated Jan. 26, 2018, 7 pages.
Nagalakshmi et al., Confident Multi-Factor Authentication on Web Application via Captcha Technologies, International Journal of Computer Engineering in Research Trends, vol. 2, Issue 8, Aug. 2015, pp. 516-522.
U.S. Appl. No. 14/754,222 Non-Final Office Action, dated Dec. 1, 2016, 10 pages.
"User Session Monitoring for CA Single Sign-On," CA Technologies, Copyright 2015 http://www.ca.com/~/media/Files/Add-OnServicesComponents/user-session-monitor-for-ca-single-sign-on.pdf, 1 page.
"The art of logging out," KTH Sweden, Apr. 26, 2013 https://www.kth.se/social/group/cas/page/the-art-of-logging-out/, 2 pages.
"IBM Security Access Manager for Enterprise Single Sign-On" retrieved from the Internet Nov. 10, 2016: http://www-03.ibm.com/software/products/en/access-mgr-esso, 2 pages.

"Understanding Jive Mobile's SSO Compliance," Jive Software, Jun. 25, 2012 https://community.jivesoftware.com/docs/DOC-61829, 11 pages.
U.S. Appl. No. 14/814,209, Final Office Action dated Jul. 31, 2017, 19 pages.
U.S. Appl. No. 15/143,240, Non-Final Office Action dated Jun. 5, 2017, 11 pages.
"Implementing Single Sign-On Across Multiple Organizations", Developer.force.com, http://wiki.developerforce.com/page/Implementing_Single_Sign-On_Across_Multiple_Organizations; Accessed on Dec. 19, 2013.
"BIG-IP Access Policy Manager", http://www.f5.com/pdf/products/big-ip-access-policy-manager-ds.pdf (copyright 2013).
Ferguson, A. and Hockings, C. Session management server: Session transitions and state. ibm.com/developerworks/ [online]. Jun. 25, 2007, IBM [retrieved May 18, 2015]. Retrieved from the Internet: <URL: http://www.ibm.com/developerworks/tivoli/library/t-sms-states/>, 7 pages.
Gaur, N. IBM Extreme Transaction Processing (XTP) Patterns: Scalable and robust HTTP session management with WebSphere eXtreme Scale. ibm.com/developerworks/ [online]. May 27, 2009, IBM [retrieved Jan. 6, 2015]. Retrieved from the Internet: <URL: http://www.ibm.com/developerworks/websphere/library/techarticles/0905_gaur/0905_gaur.html>, 8 pages.
IBM Security Access Manager for Enterprise Single Sign-On. Data Sheet [online]. Copyright 2013 IBM Corporation [retrieved on Feb. 12, 2015]. Retrieved from the Internet: <URL: http://onwireco.com/wp-content/uploads/2013/12/IBM_Security_Access_Manager_For_Enterprise_Single_Sign-On.pdf>, 8 pages.
Impersonate another user: Dynamics CRM 2015. Copyright 2015 Microsoft [retrieved Jun. 25, 2015]. Retrieved from the Internet: <URL: https://msdn.microsoft.com/en-us/library/gg334744.aspx>, 1 page.
Installing vCenter Single Sign-On in a multisite deployment (2034074). kb.vmware.com [online]. Copyright 2014 VMware, Inc. [retrieved Jan. 7, 2015]. Retrieved from the Internet: <URL: http://kb.vmware.com/selfservice/microsites/search.do?language=en_US&cmd=displayKC&externalId=2034074>, 2 pages.
Mortimore, C. and Yewell, E. Implementing Single Sign-On Across Multiple Organizations. developer.salesforce.com [online]. Copyright 2000-2014 salesforce.com, Inc. [retrieved Jan. 7, 2015]. Retrieved from the Internet: <URL: https://developer.salesforce.com/page/Implementing_Single_Sign-On_Across_Multiple_Organizations>, 15 pages.
Multiple Data Centers. support.ca.com [online]. Copyright 2014 CA [retrieved Jan. 7, 2015]. Retrieved from the Internet: <URL: https://support.ca.com/cadocs/0/CA%20SiteMinder%2012%2052%20SP1-ENU/Bookshelf_Files/HTML/idocs/index.htm?toc.htm?706393.html?intcmp=searchresultclick&resultnum=452>, 8 pages.
Oracle Enterprise Single Sign-On Suite Plus 11gR2 PS2. White Paper [online]. Jan. 2014, Oracle Corporation [retrieved on Jul. 30, 2015]. Retrieved from the Internet: <URL: http://www.oracle.com/technetwork/middleware/id-mgmt/esso-suite-technical-whitepaper-1519077.pdf>, 25 pages.
Oracle Fusion Middleware Developer's Guide for Oracle Access Management: Developing an Application to Manage Impersonation. Copyright 2015 Oracle [retrieved on Jun. 26, 2015]. Retrieved from the Internet: <URL: https://docs.oracle.com/cd/E52734_01/oam/AIDEV/impersonation.htm#AIDEV422>, 11 pages.
Oracle Fusion Middleware Developing Web Applications, Servlets, and JSPs for Oracle WebLogic Server: Using Sessions and Session Persistence. Copyright 2015 Oracle [retrieved May 18, 2015]. Retrieved from the Internet: <URL: http://docs.oracle.com/cd/E12839_01/web.1111/e13712/sessions.htm#WBAPP301>, 6 pages.
Oracle Fusion Middleware Performance and Tuning for Oracle WebLogic Server: Tuning Web Applications. Copyright 2015 Oracle [retrieved May 18, 2015]. Retrieved from the Internet: <URL: http://docs.oracle.com/cd/E12839_01/web.1111/e13814/webapptune.htm#PERFM368>, 3 pages.
Rivard, J. Clearing Novell Access Manager Application Sessions. Jan. 26, 2009, NetIQ [retrieved Jun. 13, 2016]. Retrieved from the Internet: <URL: https://www.netiq.com/communities/cool-solutions/clearing-novell-access-manager-application-sessions/>, 4 pages.

(56) References Cited

OTHER PUBLICATIONS

Stirpe, P. and Shah, A. Time-out Management in Multi-domain Single Sign-On. Strattagroup.com [online]. Copyright 2005 The Stratta Group [retrieved Jan. 6, 2015]. Retrieved from the Internet: <URL: http://www.strattagroup.com/tsg/pubs/ssotime-out.pdf>, 13 pages.
Symantec Identity: Access Manager. Data Sheet [online]. Copyright 2014 Symantec Corporation [retrieved on Feb. 12, 2015]. Retrieved from the Internet: <URL: http://www.symantec.com/content/en/us/enterprise/fact_sheets/b-symantec_identity_access_manager_DS_21227840>, 2 pages.
Volodarsky, M. asp.net: Fast, Scalable, and Secure Session State Management for Your Web Applications. Copyright 2015 Microsoft [retrieved May 18, 2015]. Retrieved from the Internet: <URL: https://msdn.microsoft.com/en-us/magazine/cc163730.aspx>, 9 pages.
Ye, W. A complete Impersonation Demo in C#.NET. Jun. 20, 2013, Code Project [retrieved on Jun. 25, 2015]. Retrieved from the Internet: <URL: http://www.codeproject.com/Articles/125810/A-complete-Impersonation-Demo-in-Csharp-NET>, 12 pages.
U.S. Appl. No. 61/880,335, filed Sep. 20, 2013.
U.S. Appl. No. 61/880,400, filed Sep. 20, 2013.
U.S. Appl. No. 61/880,569, filed Sep. 20, 2013.
U.S. Appl. No. 61/880,598, filed Sep. 20, 2013.
U.S. Appl. No. 14/754,222, filed Jun. 29, 2015.
U.S. Appl. No. 14/135,053, Final Office Action dated Jul. 6, 2015, 17 pages.
U.S. Appl. No. 14/135,053, Non-Final Office Action dated Jan. 29, 2015, 16 pages.
U.S. Appl. No. 14/135,053, Non-Final Office Action dated Nov. 25, 2015, 18 pages.
U.S. Appl. No. 14/135,053, Notice of Allowance, dated May 20, 2016, 10 pages.
U.S. Appl. No. 14/137,775, Non-Final Office Action dated May 22, 2015, 10 pages.
U.S. Appl. No. 14/137,775, Notice of Allowance dated Sep. 16, 2015, 9 pages.
U.S. Appl. No. 14/491,076, Non-Final Office Action dated Mar. 11, 2016, 13 pages.
U.S. Appl. No. 15/005,365, Non-Final Office Action dated Aug. 24, 2016, 11 pages.
U.S. Appl. No. 14/491,076, Final Office Action dated Oct. 6, 2016, 19 pages.
U.S. Appl. No. 14/491,076, Final Office Action dated Oct. 25, 2016, 18 pages.
U.S. Appl. No. 14/135,053, Notice of Allowance dated Aug. 31, 2016, 9 pages.
Murdoch "Hardened Stateless Session Cookies," Lecture Notes in Computer Science, pp. 93-101 (2008).
"Developing an Application to Manage Impersonation" *Fusion Middleware Developer's Guide for Oracle Access Management* (Nov. 2012) 10 pages.
"Developing an Application to Manage Impersonation," *Oracle® Fusion Middleware Developer's Guide for Oracle Access Management* https://docs.oracle.com/cd/E52734_01/oam/AIDEV/impersonation.htm#AIDEV422 (Oct. 2016) 11 pages.
"Impersonate another user" Microsoft Dynamics CRM 2015 https://msdn.microsoft.com/en-us/library/gg334744.aspx (Jun. 2015) 1 page.
Volodarsky "asp.net: Fast, Scalable, and Secure Session State Management," Microsoft MSDN Magazine https://msdn.microsoft.com/en-us/magazine/cc163730.aspx (Sep. 2005) 9 pages.
"Tuning Web Applications" *Oracle Fusion Middleware Performance and Tuning for Oracle WebLogic Server* http://docs.oracle.com/cd/E12839_01/web.1111/e13814/webapptune.htm#PERFM368 (Copyright 2015) 3 pages.
"Using Sessions and Session Persistence" *Oracle Fusion Middleware Developing Web Applications, Servlets, and JSPs for Oracle WebLogic Server* http://docs.oracle.com/cd/E12839_01/web.1111/e13712/sessions.htm#WBAPP301 (May 2009) 6 pages.
"Session management server: Session transitions and state," IBM, Inc. http://www.ibm.com/developerworks/tivoli/library/t-sms-states/ (Jun. 2007) 7 pages.
Rivard "Clearing Novell Access Manager Application Sessions," https://www.netiq.com/communities/cool-solutions/clearing-novell-access-manager-application-sessions/ (Jan. 2009) 4 pages.
U.S. Appl. No. 15/707,261, Non-Final Office Action dated Sep. 13, 2018, 10 pages.
U.S. Appl. No. 14/814,209, Final Office Action dated Jan. 4, 2019, 21 pages.
U.S. Appl. No. 15/291,804, First Action Interview Pilot Program Pre-Interview Communication dated Jan. 11, 2019, 4 pages.
U.S. Appl. No. 15/291,804, First Action Interview Office Action Summary dated Jun. 17, 2019, 5 pages.
U.S. Appl. No. 15/707,261, Final Office Action dated Mar. 8, 2019, 6 pages.
U.S. Appl. No. 15/707,261, Notice of Allowance dated Jun. 27, 2019, 5 pages.
U.S. Appl. No. 15/356,384, First Action Interview Pilot Program Pre-Interview Communication dated Feb. 8, 2019, 5 pages.
U.S. Appl. No. 15/15/356,384, Notice of Allowance dated Jun. 12, 2019, 9 pages.

\* cited by examiner

ACCESS MANAGER SESSION MANAGEMENT STRATEGY

CROSS-REFERENCES TO RELATED APPLICATIONS

This U.S. Non-provisional application claims the benefit and priority of U.S. Provisional Application No. 62/245,529, filed on Oct. 23, 2015, entitled "ACCESS MANAGER SESSION MANAGEMENT STRATEGY," the content of which is herein incorporated by reference in its entirety for all purposes.

BACKGROUND

Generally, the present application relates to data processing. More specifically, the application is related to techniques for managing sessions in an access management system.

Modern businesses rely on a variety of applications and systems that control and generate information that is critical to business operations. Different applications often provide different services and information, and different users may require access to different levels of information within each system or application. The level of access that users are granted may depend on the role of the user. For example, a manager may need access to certain information about employees that report to him, but it may be improper for that manager to access the same information about those whom he reports to.

Earlier less sophisticated applications incorporated access management business logic directly into the application code. That is to say, each application would require users to have a separate account, separate policy logic, and separate permissions, for example. Furthermore, when a user is authenticated by one of these applications, this authentication remains unknown to other applications in the enterprise because the fact that authentication with the first application has taken place is not shared. Thus, there is no concept of trust between applications using different systems for authentication and access control. Engineers quickly realized that having an access management system for each application in an enterprise was much like having a gas station for each car, and determined that authentication and access control would be more efficiently implemented and managed as a shared resource. These shared resources became known as an access management systems.

Access management systems often use policies and other business logic to make a determination regarding whether a particular access request should be granted to a particular resource. Upon making a determination that access should be granted, a token is provided to a client (e.g., client application at a device) of the requestor. This token is like a key that can be used to open a door that guards restricted data. For example, a user may attempt to access a human resources database to gather information about certain employees such as salary information. The user's web browser at a client makes a request to the application, which requires authentication. If the web browser does not have a token, the user is asked to log in to the access management system. When the user is authenticated, the user's browser at the client receives a token that may be used to access the human resources application.

In an enterprise, users (e.g., employees) typically may have access to one or more different systems and applications. Each of these systems and applications may utilize different access control policies and require different credentials (e.g., user names and passwords). A user wanting to access multiple resources protected by an access management system may need to be authenticated by credentials provided to the access management system. A successful authentication gives the user authorization to access the protected resources, based on their assigned access privileges.

Upon authentication, the access management system may establish a session ("user session") to provide the access granted to the protected resource(s). For a user session, the access management system may maintain session information at a computing system (e.g., server computer) for the user session. The session information maintained by access management system may be referred to as a server-side session. The access management system may store session information for the server-side session that defines the access granted to the user and the constraints of the session. The session information for a server-side session may be mapped to a client which is provided with a token. In the instance where a SSO session is established, the access management system enforces access for SSO based on the token.

If a user wants to access multiple resources protected the access management system, the access management system may determine whether the user is authenticated to access the multiple resources requested by a user. In some instances, authentication of a user for one resource may suffice for accessing other resources, otherwise the access management system may request additional credentials from the user. Upon authentication to access multiple resources, the user may not need to re-authenticate to access additional resources. In such instances, the access management system may maintain a single session, such as a single sign-on session (SSO), that provides a user with access to multiple resources after authentication.

Some access management systems may utilize different storage techniques to manage (e.g., create, read, update, or delete operations) session information for a session. Session information may include information about the user and the user session for which the user is authenticated. Managing session information may include accessing an identity store to query information about user. However, once information is accessed from the identity store, the access management system may not need to access the information for subsequent accesses by the user for the session. An access management system may incur performance overhead from repeated access to the identity store for information that rarely changes.

After authentication of a user to establish a session, an access management system may update session information for subsequent accesses to a resource. Subsequent accesses may result in determining authorization and/or performing additional authentication (e.g., step-up authentication), either of which cause session information to be updated.

Updating session information may cause significant performance and/or memory usage overhead. For example, an access management system implemented by a computing system having multiple computing nodes, may implement locking techniques, such as distributed locking, to permit session information to be updated, even if the update is a timestamp. In some instances, distributed account locking may be performed to update session information. The locking technique may cause the access management system to encounter performance issues to implement locking where storage is shared in a distributed fashion. Based on the number of attributes and the group memberships that are stored for a user in an identity store, each session belonging to specific user may be duplicated for the session. If a user's status changes in an identity store, each of the sessions needs to be identified and deactivated to enable the sessions to be updated. In some instances, session aggregation and updates may be performed across computing nodes of an access management system.

Where distribute cache is implemented to store session information, the session information may be evicted from memory and serialized to a backend session database based on cache eviction policy. Updating session information that is currently serialized to a database can cause huge performance overhead for the access management system. In some instances, even when different storage techniques are implemented, session information may be replicated for multiple sessions that exist for a user on multiple clients. Memory may need to be optimized on a per session basis, thereby contributing to memory usage overhead to maintain session information.

BRIEF SUMMARY

The present disclosure relates to managing sessions in an access management system. Specifically, techniques are disclosed for managing session information stored by an access management system.

Techniques may be implemented, such that the method for managing and storing session information may by dynamic, changing based on one or more characteristics of the session. Session information that changes less frequently can be managed through a data store in a distributed, scalable manner optimized for reading and modification. Session information that changes frequently may be managed by sending the session information to the client requesting access so that the session information does not need to be maintained by the access management system. Techniques are disclosed to show how session information is updated and the frequency in which the session information is updated. Certain embodiments may enable a decrease in computing performance overhead and/or memory usage overhead caused by managing session information (e.g., performing authentication or determining authorization to access a resource) for a session according to techniques disclosed herein.

An access management system can improve management of a session (e.g., server-side session) by storing session information for a session based on the attributes of the session information. Session information may include, without restriction: 1) authenticated user subject information obtained from a user identity store (e.g., identifier of the identity store used for authentication, user identifier, user domain name, user GUID, and group membership for user); 2) list of partners accessed in session; 3) IP Address of the client device; 4) authentication Level; 5) authentication scheme; 6) authentication timestamp; and 7) application domain information for accessed resource. Session information for a session may be designated into two different categories: 1) session information that does not change often or that rarely changes during an active session; and 2) session information that changes frequently during an active session.

Session information that does not change often or rarely changes may be stored in highly scalable distributed cache for optimized concurrent reads. The data for the session information can be indexed by an identity store name and the domain name (DN). Examples of session information that does not change often may include information about the authenticated user subject.

Session information that changes frequently can be stored using a variety of different techniques. Examples of such session information may include list of partners accessed in session; Internet protocol (IP) Address of the client device; authentication level; authentication scheme; authentication timestamp; and application domain information for one or more accessed resources, as indicated above. One technique to store session information that changes frequently can be to implement a scalable distributed cache optimized for frequent updates.

Another technique for storing session information that changes frequently can be through a sequence of communications between the client and the access management system. Using this technique, session information can be passed to a client via a response. This can be considered as a signed access claim. The client would make sure that the information is fetched from the device and passed back to the access management system during subsequent accesses This session information must include identity store identifier and DN of the authenticated user. Using this signed access claim, the access management system would be able to determine a server-side session using information in access claim and looking up the subject information from distributed cache. During subsequent authorizations there may not be a need to update subject information. All the information to be updated may be part of access claim sent by the client. The updated claim may be sent back to client by the access management system. In this case updating the claim sent by the client and sending the claim back to the client may not cause performance overhead. Since the access management system does not store session information that is included in the access claim, the access management system may not need to implement distributed locking, which may contribute to performance overhead.

In the techniques described above for storing frequently changing session information, the sessions may be referring to subject information, which can be retrieved from cache or from user identity store. Even if same user logs-in from different clients/devices, only single subject information may be available in the cache; which will be shared by all sessions of same user. Also this same identity store information and user DN may be part of all the access claims for a user. With the approaches described above, session information may not be stored per session for a unique user. There may be only a single entry for all the sessions created for same user. If server-side session usage tracking is required, then a session-per-user login can be created which would refer to common subject information. This can reduce the server-side session footprint to great extent and optimize memory utilization of the access management system. If the user account is locked, the session information may be updated in user identity store. At the same time only a single entry in the cache may be invalidated if it exists. All the sessions for the same user may be invalidated automatically.

In some embodiments, an access management system may include a computer system that is configured to implement methods and operations disclosed herein. A computer system may include one or more processors and one or more memory accessible to the one or more processors and storing one or more instructions which, upon execution by the one or more processors, causes the one or more processors to implement methods and/or operations disclosed herein. Yet other embodiments relate to systems and machine-readable tangible storage media which employ or store instructions for methods and operations disclosed herein.

In some embodiments, a method may include receiving, from a device, a first request by a user to access one or more resources at the device. The method may include, using information about the user obtained from an identity data store and based on authentication of the user for access to one or more resources, establishing a session for the user of the device to access one or more resources, wherein session information is generated for one or more attributes of the session. The method may include storing information about the user in a data store of the access management system, where the information is associated with an identifier, and wherein the information includes user access information. The method may include sending, to the device, a response about the session that is established, where the response includes the session information, the identifier, and the user access information. The method may include receiving, from the device, a second request for access to a resource, the request including the session information, the identifier, and the user access information. The method may include accessing, from the data store, based on the identifier and the user access information, the information about the user. The method may include determining, based on the session information and the information accessed from the data store, the session established for the user. The method may include based on authorization of the user to access the resource, providing the user at the device with access to the resource based on the determined session. The method may include updating the session information based on the access to the resource using the session. The method may include sending, by the computer system, the updated session information to the device.

In some embodiments, the session information includes one or more of a list of partners accessed in session, an Internet protocol (IP) address of the device, an authentication level of the session, an authentication scheme of the session, an authentication timestamp of the session, or application domain information for one or more resources accessed during the session.

In some embodiments, the data store is implemented as a cache accessible in a distributed manner to the access management system.

In some embodiments, the response includes an access token, and wherein the request includes the access token sent in the response to the device.

In some embodiments, information about the user includes user identity information.

In some embodiments, the identifier indicates an identification of the data store, and the user access information includes a domain name of the user.

In some embodiments, the method includes based on the information accessed about the user, determining that access by the session is locked; and denying the user at the device with access to the resource based on the determined session.

In some embodiments, the request is a first request, the session is a first session, the device is a first device, the session information is first session information. The method may include: establishing a second session for the user to access the resource at a second device; sending, to the second device, a response about the second session that is established, where the response includes second session information, the identifier, and the user access information; receiving, from the second device, a second request for access to the resource, the request including the second session information, the identifier, and the user access information; accessing, from the data store, based on the identifier and the user access information in the second request, the information about the user; determining, based on the second session information and the information accessed from the data store, the second session established for the user; based on authorization of the user to access the resource, providing the user at the second device with access to the resource based on the determined second session; updating the second session information based on the access to the resource using the second session; and sending, by the computer system, the updated second session information to the second device. In some embodiments, the method may include determining, based on the information about the user, that access by the second session is locked; and denying the user at the second device with access to the resource based on the determined second session.

In some embodiments, the request is a first request, and the resource is a first resource. The method may include; receiving, a second request by the user at the device to access a second resource, the second request including the session information, the identifier, and the user access information; accessing, from the data store, based on the identifier and the user access information in the second request, the information about the user; determining, based on the session information and the information accessed from the data store, the session established for the user; based on authorization of the user to access the second resource, providing the user at the device with access to the second resource based on the determined session; updating the session information based on the access to the second resource using the session; and sending, by the computer system, to the device, the updated session information based on the access to the second resource. In some embodiments, the method may include determining that access to the second resource is based on additional authentication of the user, where the session information is updated for the second resource to indicate the additional authentication.

The foregoing, together with other features and embodiments will become more apparent upon referring to the following specification, claims, and accompanying drawings.

BRIEF DESCRIPTION OF THE DRAWINGS

Illustrative embodiments of the present disclosure are described in detail below with reference to the following drawing figures.

DETAILED DESCRIPTION

In the following description, for the purposes of explanation, specific details are set forth in order to provide a thorough understanding of embodiments of the disclosure. However, it will be apparent that various embodiments may be practiced without these specific details. For example, circuits, systems, algorithms, structures, techniques, networks, processes, and other components may be shown as components in block diagram form in order not to obscure the embodiments in unnecessary detail. The figures and description are not intended to be restrictive.

The present disclosure relates generally to providing single sign-on (SSO) access. A SSO session may provide a user with access to one or more systems after authentication of credential information (e.g., a username and a password). Access to a system may provide access to one or more resources. Resources may include any item managed and/or stored by a computing system, such as an application, a document, a file, electronic content, and/or the like. A resource may be identified by a uniform resource locator (URL) or other data indicating a source of the resource.

I. High-Level Overview of Access Management System for Managing Sessions

Figure 1:
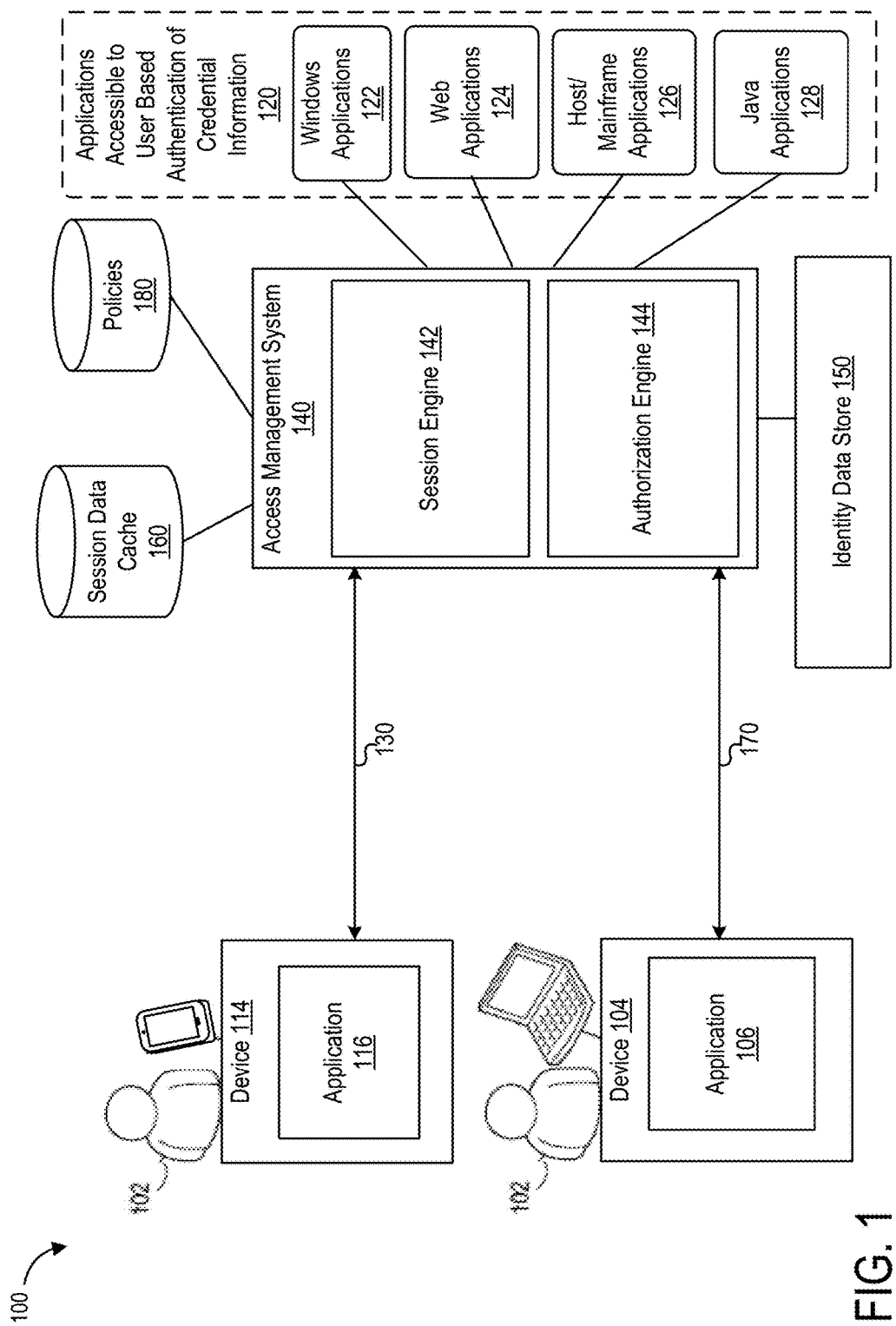
FIG. 1 illustrates a high-level diagram of a system for managing session information, in accordance with an embodiment.

Some embodiments, such as systems, methods, and machine-readable media are disclosed for managing session information. FIG. 1 illustrates a system 100 in which session information can be stored such that memory and performance usage may be minimized, thereby reducing the time for managing sessions across multiple clients (e.g., applications and devices).

FIG. 1 illustrates a system 100 in which a user (e.g., user 102) operating multiple clients (e.g., an application on a device or a device). User may operate a first client (e.g., device 104 or application 106 executing on device 104) to request access to resources. A user may operate a second client (e.g., device 114 or application 116 executing on device 114) Authentication of a user with access management system 140 and authorization of the user to access specific resources, may be managed by access management system 140. In some embodiments, access management system 140 may include a session engine 142 that manages authentication of a user and one or more sessions created to enable access for the user. Access management system 140 may include an authorization engine 144 to determine authorization of a user to access particular resources.

For purposes of illustration, "session" as described herein includes an SSO session; however, a session may include other types of sessions enabling access to a user. Access management system 140 may provide access to one or more resources. Access management system 140 may implement a sign-on system, e.g., a SSO system, which can establish an SSO session to provide SSO access to one or more resources.

Access management system 140 may store session information for each session created to enable a user with access. Session information may include, without restriction, 1) authenticated user subject information such as user identity information (e.g., user identifier, user domain name, user group user identification (GUID), and group membership for user); 2) list of partners accessed in session; 3) Internet protocol (IP) address of a client; 4) authentication level; 5) authentication scheme; 6) authentication timestamp; and 7) application domain information for one or more resources that are accessed. Access management system 140 may employ a variety of techniques disclosed here in for management of session information for each session.

Resources may include, without restriction, a file, a web page, a document, web content, a computing resource, or an application. For example, system 100 may include resources such as applications 120 and/or content accessible through those applications 120. A resource may be requested and accessed using an application. For example, an application may request access to a web page from a resource server based on a URL identifying a requested resource. Resources may be provided by one or more computing systems, e.g., a resource computer server that provides access to one or more resources upon authentication of user 102 in a SSO system. Although a user may be authenticated with access, each user may have different rights to access different resources. As such, authorization may be determined for each resource. Authorization may be determined for each resource server that provides a resource.

User 102 operating a client device, e.g., device 104 or device 114, may present one or more interfaces that accept input to enable a user to interact with an access management system (e.g., access management system 140). The interfaces may be accessible using an application (e.g., application 106 or application 116) executing on a device. The application and/or interfaces may be provided by access management system 140 as part of a service.

Each of device 104 and device 114 may include a computing device. The computing device may include a computing system such as one or more computers and/or servers (e.g., one or more access manager servers), which may be general purpose computers, specialized server computers (including, by way of example, PC servers, UNIX servers, mid-range servers, mainframe computers, rack-mounted servers, etc.), server farms, server clusters, distributed servers, or any other appropriate arrangement and/or combination thereof. Device 104 and device 114 may run any of operating systems or a variety of additional server applications and/or mid-tier applications, including HTTP servers, FTP servers, CGI servers, Java servers, database servers, and the like. Exemplary database servers include without limitation those commercially available from Oracle, Microsoft, and the like. Devices 104, 114 may be implemented using hardware, firmware, software, or combinations thereof.

Each of devices 104, 114 may include at least one memory, one or more processing units (or processor(s)), and storage. The processing unit(s) may be implemented as appropriate in hardware, computer-executable instructions, firmware, or combinations thereof. In some embodiments, access management system 140 may include several subsystems and/or modules. Devices 104, 114 may be implemented to operate using in hardware, software (e.g., program code, instructions executable by a processor) executing on hardware, or combinations thereof. In some embodiments, the software may be stored in a memory (e.g., a non-transitory computer-readable medium), on a memory device, or some other physical memory and may be executed by one or more processing units (e.g., one or more processors, one or more processor cores, one or more GPUs, etc.). Computer-executable instructions or firmware implementations of the processing unit(s) may include computer-executable or machine-executable instructions written in any suitable programming language to perform the various operations, functions, methods, and/or processes described herein. The memory may store program instructions that are loadable and executable on the processing unit(s), as well as data generated during the execution of these programs. The memory may be volatile (such as random access memory (RAM)) and/or non-volatile (such as read-only memory (ROM), flash memory, etc.). The memory may be implemented using any type of persistent storage device, such as computer-readable storage media. In some embodiments, computer-readable storage media may be configured to protect a computer from an electronic communication containing malicious code. The computer-readable storage media may include instructions stored thereon, that when executed on a processor, perform the operations described herein.

Access management system 140 may be implemented by a computing system. The computing system may include one or more computers and/or servers (e.g., one or more access manager servers), which may be general purpose computers, specialized server computers (including, by way of example, PC servers, UNIX servers, mid-range servers, mainframe computers, rack-mounted servers, etc.), server farms, server clusters, distributed servers, or any other appropriate arrangement and/or combination thereof. Access management system 140 may run any of operating systems or a variety of additional server applications and/or mid-tier applications, including HTTP servers, FTP servers, CGI servers, Java servers, database servers, and the like. Exemplary database servers include without limitation those commercially available from Oracle, Microsoft, and the like. Access management system 140 may be implemented using hardware, firmware, software, or combinations thereof.

In some embodiments, access management system 140 may be implemented by multiple computing devices (e.g., server computers) deployed as a cluster. Each of the server computers in the cluster may be a different computing node, which may communicate with one or more clients. Each computing node may handle authentication and authorization for session management. The cluster may be deployed as part of a data center, which allows for scalability and high availability. Multiple such geographically dispersed data centers with access manager server clusters can be connected (wired or wirelessly) to constitute a multi-data center (MDC) system. An MDC system may satisfy high availability, load distribution, and disaster recovery requirements of access servers within an enterprise computer network. An MDC system may act as a single logical access server to support SSO services for access management system 140.

Access management system 140 may include at least one memory, one or more processing units (or processor(s)), and storage. The processing unit(s) may be implemented as appropriate in hardware, computer-executable instructions, firmware, or combinations thereof. In some embodiments, access management system 140 may include several subsystems and/or modules. For example, access management system 140 may include session engine 142 and authorization engine 144, each of which may be implemented in hardware, software (e.g., program code, instructions executable by a processor) executing on hardware, or combinations thereof. In some embodiments, the software may be stored in a memory (e.g., a non-transitory computer-readable medium), on a memory device, or some other physical memory and may be executed by one or more processing units (e.g., one or more processors, one or more processor cores, one or more GPUs, etc.). Computer-executable instructions or firmware implementations of the processing unit(s) may include computer-executable or machine-executable instructions written in any suitable programming language to perform the various operations, functions, methods, and/or processes described herein. The memory may store program instructions that are loadable and executable on the processing unit(s), as well as data generated during the execution of these programs. The memory may be volatile (such as random access memory (RAM)) and/or non-volatile (such as read-only memory (ROM), flash memory, etc.). The memory may be implemented using any type of persistent storage device, such as computer-readable storage media. In some embodiments, computer-readable storage media may be configured to protect a computer from an electronic communication containing malicious code. The computer-readable storage media may include instructions stored thereon, that when executed on a processor, perform the operations described herein.

FIG. 1 shows an example in which user 102 can engage in communication with access management system 140 to access resources, such as any one of applications 120 or the resources accessible through applications 120. Applications 120 may be accessible to user 102 upon successful authentication of credential information for user 102. Before one of applications 120 is accessible to user 102 at device 104, user 102 may be authenticated for a session that provides user 102 with access to applications 120. Device 104 may initiate an authentication process by requesting access from access management system 140. The authentication process may include device 104 displaying one or more GUIs to receive credential information of a user and submitting a request for authentication to access management system 140. Authentication may be established based on verifying credential information of the user 102.

In attempting to access an application, user 102 may operate an application (e.g., application 106) that manages access to a user's account via access management system 140. For example, application 106 is an access management application that may present GUIs. Using application 106, user 102 may request access to one or more resources, engage in authentication, and request modification of an authentication level. Client devices 104, 114 may communicate with access management system 140 via one or more communication networks 170, 130, respectively. Examples of communication networks may include a mobile network, a wireless network, a cellular network, a local area network (LAN), a wide area network (WAN), other wireless communication networks, or combinations thereof.

Communications between device 104 and access management system 140 can be received through a gateway system. The gateway system may support access management services. For example, a single sign-on (SSO) gateway may implement one or more access agents, e.g., a web gate agent, to balance and/or handle requests from clients and access management system 140.

Resources (e.g., applications 120) may be accessible to user 102 based on successful authentication of credential information. Upon receiving the credential information, session engine 142 may verify whether a requested resource, e.g., application 106, is a protected resource that requires credentials for access. Session engine 142 may request authorization engine 144 to determine whether access to a resource is protected. Upon determining that access determines that the resource is not protected, session engine 142 may grant access to a resource. Upon determining that access to a resource is protected, session engine 142 may determine authentication of user 102 based on the credential information. Upon determining authentication of user 102, authorization engine 144 may determine whether user 102 is authorized to access a resource based on access permitted to user 102. Session engine 142 may send a communication to device 104 to indicate whether access to a resource is permitted by user 102. Application 106 may be enabled to user 102 based on whether access is permitted.

Access management system 140 may provide many SSO services including management of access (e.g., granting/denying access) to resources, automatic sign-on, application password change and reset, session management, application credential provisioning, as well as authentication of a session. In some embodiments, access management system 140 can provide automatic single sign-on functionality for applications 120, such as Windows® applications, Web application, Java® applications, and mainframe/terminal-based applications running or being accessed from client devices. As explained above, access management system 120 may perform authentication of a user (e.g., user 102) operating a client device (e.g., device 104).

In some embodiments, access management system 140 may use one or more policies stored in a data store 180 ("policies") to control access to resources. Policies 180 may include an authentication policy that specifies the authentication methodology to be used for authenticating the user for whom the access must be provided on a given resource. Policies 180 may include an access policy that defines the way in which the resource access is to be protected (e.g., type of encryption, or the like). Policies 180 may include an authorization policy that specifies the conditions under which a user or group of users has access to a resource. For example, an administrator may only authorize certain users within a group to access particular resources. Access management system 140 may determine authentication for an SSO session based on one or more of policies 180.

Access management system 140 may also include or be coupled to additional storage, which may be implemented using any type of persistent storage device, such as a memory storage device or other non-transitory computer-readable storage medium. In some embodiments, local storage may include or implement one or more databases (e.g., a document database, a relational database, or other type of database), one or more file stores, one or more file systems, or combinations thereof. For example, access management system 140 is coupled to or includes one or more data stores for storing data such as identity data store 150, session data cache 160 and policies 180. The memory and the additional storage are all examples of computer-readable storage media. For example, computer-readable storage media may include volatile or non-volatile, removable or non-removable media implemented in any method or technology for storage of information such as computer-readable instructions, data structures, program modules, or other data.

Session engine 142 may handle processing to determine whether a valid session exists for user 102 to access a resource. Access management system 140 may store session data in session data cache 160. In some embodiments, the rarely changing information (e.g., subject information) may be stored in session data cache 160. The subject information may be obtained from an identity data store 150. Session information that changes frequently may be sent to a client device for storage and received in communication from the client device. Session engine 142 checks for a valid session for user 102 to access a requested resource that is protected. Session engine 142 may assess validity of a session for user 102 based on consideration of one or more access policies applicable to user 102. Based on determining that a valid session does not exist for user 102, session engine 102 may request 108 credential information ("credentials") from user 102. Successful authentication of the credential information may provide the user with access to one or more resources, which may include a requested resource.

Requests may be communicated to device 104 via communication network 170. A request may prompt user 102 for user credentials to determine authentication of a session. Request may include information (e.g., a URL) to a web page or a user interface (e.g., a web page, portal, or dashboard) to receive credential information.

Session engine 142 may perform operations to authenticate credential information for user 102. In some embodiments, session engine 142 may store information about sessions established upon successful authentication of a user. For a SSO session (e.g., SSO authenticated sessions), the SSO session may be managed as a SSO session enabling access to all resources accessible to user based upon successful authentication of credential information for a user.

In some embodiments, session engine 142 may communicate with authorization engine 144 regarding the scope of authentication. Session engine 142 can send the scope information received from device 104 to authorization engine 144. Authorization engine 144 can determine resources that are protected and based on authentication sessions, can determine resources that are permitted and/or restricted for a session.

In some embodiments, access management system 140 may be implemented in system 100 according to an agent-server model for communication between device 104 and any one of access manager servers implemented for access management system 140. The agent-server model may include an agent component (e.g., a gateway system) and a server component. The agent component may be deployed on a host system and the server component may be deployed on a server, e.g., an access manager server. User 102 operating device 104 may communicate with access management system 140 via agent using an enterprise computer network. In some embodiments, the agent may be an application or embedded in an application on device 104. Device 104 may be a workstation, personal computer (PC), laptop computer, smart phone, wearable computer, or other networked electronic device.

Agent may provide access control and may operate to protect access management system 140 and any resources accessible through access management system 140 against external and internal web-based threats. Access management system 140 may communicate with one or more resource computing systems (e.g., resource servers) that provide access to one or more resources, e.g., applications 120. Agent may implement or operate as the agent component access management system 140 and may include a server that operates as the server component. Each resource accessible by access management system 140 may be protected through an agent, e.g., agent. Agent may intercept user requests for one or more resources protected by it and check for user credentials in order to authenticate the user. The agent may then contact a server, e.g., an access manager server at access management system 140. The access management server may verify whether a resource is a protected resource that requires credentials for access. If the access management server determines that the resource is not protected, agent may grant access to user 102. If the resource is protected, agent may request user 102 to provide authentication credentials.

In some embodiments, communication between agent and access management system 140 may be split into two different channels of communication. For example, communication via a front-channel may use a hypertext transfer protocol secure (HTTPS) protocol. Front-channel communications may include less frequent communications, such as communications for credential collection operations for authentication. Communication via a back-channel may use an open access protocol (OAP). Back-channel communications may include more frequent communications, such as agent-server interactions including requests for access to a resource managed by access management system 140. Each channel may communicate using an access token designed for the type of communication over the channel. The access flow may generate two types of browser tokens. A first token is an access management ID token (e.g., OAM_ID token), which serves the SSO requests that are being propagated over HTTP. A second token is an authorization token (e.g., OAMAuthn Token) that may be used to server the SSO requests that are being propagated over OAP. The browser tokens may be stored as host cookies at device 104.

Access management system 140 (e.g., using agent) may present user 102 with a request for authentication credentials in the form of a challenge (e.g., via the user's web browser at device 104). In some embodiments, user 102 can access SSO user interface through a client executing on device 104 or through a web browser on device 104. The SSO user interface may be implemented at access management system 140. Access management system 140 may send, with request 108, the SSO user interface or information (e.g., a URL) enabling access to the SSO user interface.

In some embodiments, an SSO user interface can include a list of the applications user 102 commonly utilizes. User 102 can manage their credentials and policies associated with applications through the SSO user interface. When user 102 requests to access an application, e.g., application 140, through the SSO user interface, a request may be sent from device 104 to access management system 140 to determine a policy type for the application from one or more policies 160 applicable to user 102. Access management system 140 may determine whether a valid session exists for the user and if so, then it can determine user's 102 credential information based on the policy type.

In some embodiments, the request may include an authentication cookie from a previous login that can be used to determine whether user 102 is authorized to retrieve the credential. If authorized, the user can be logged into the application using the credential. In some embodiments, agent can enable users to access applications 120 using SSO services provided by access management system. Access may be provided through a web browser directly, without first accessing the SSO user interface or using a client executing on device 104. If user 102 is not authorized, then access management system may request 108 credentials from user 102. The SSO user interface may present an interface to receive input including credential information. The credential information may be sent 110 to access management system 140 to determine authentication of user 102.

In some embodiments, credential types can be supported, such as Oracle Access Management protected resources, federated applications/resources, and form-fill applications. Examples of credential types may include a Smartcard/Proximity card, a token, a public key infrastructure (PKI), a Windows Logon, a lightweight directory access protocol (LDAP) logon, a biometric input, or the like. For OAM protected resources, user requests can be authenticated and then directed to URLs associated with the requested resources. For Federated Applications, links to federated partners and resources can be provided, including business to business (B2B) partner applications and SaaS applications. For form fill applications, templates can be used to identify fields of application web pages through which credentials can be submitted.

II. Processes for Session Management

Access management system 140 can improve computing performance for management of session information by changing the way session information is stored. For example, for a user that authenticates from multiple clients, access management system 140 can optimize storage management and reduce processing by managing session information. Specific details about a session that change frequently may be managed individually for each session created for each user authenticated at a different client. Session information that is common, or shared between sessions created for a user at different clients may be stored centrally, in a distributed cache, where storage is abundant and the effects of delays caused by accessing the storage can be minimized.

Figure 2:
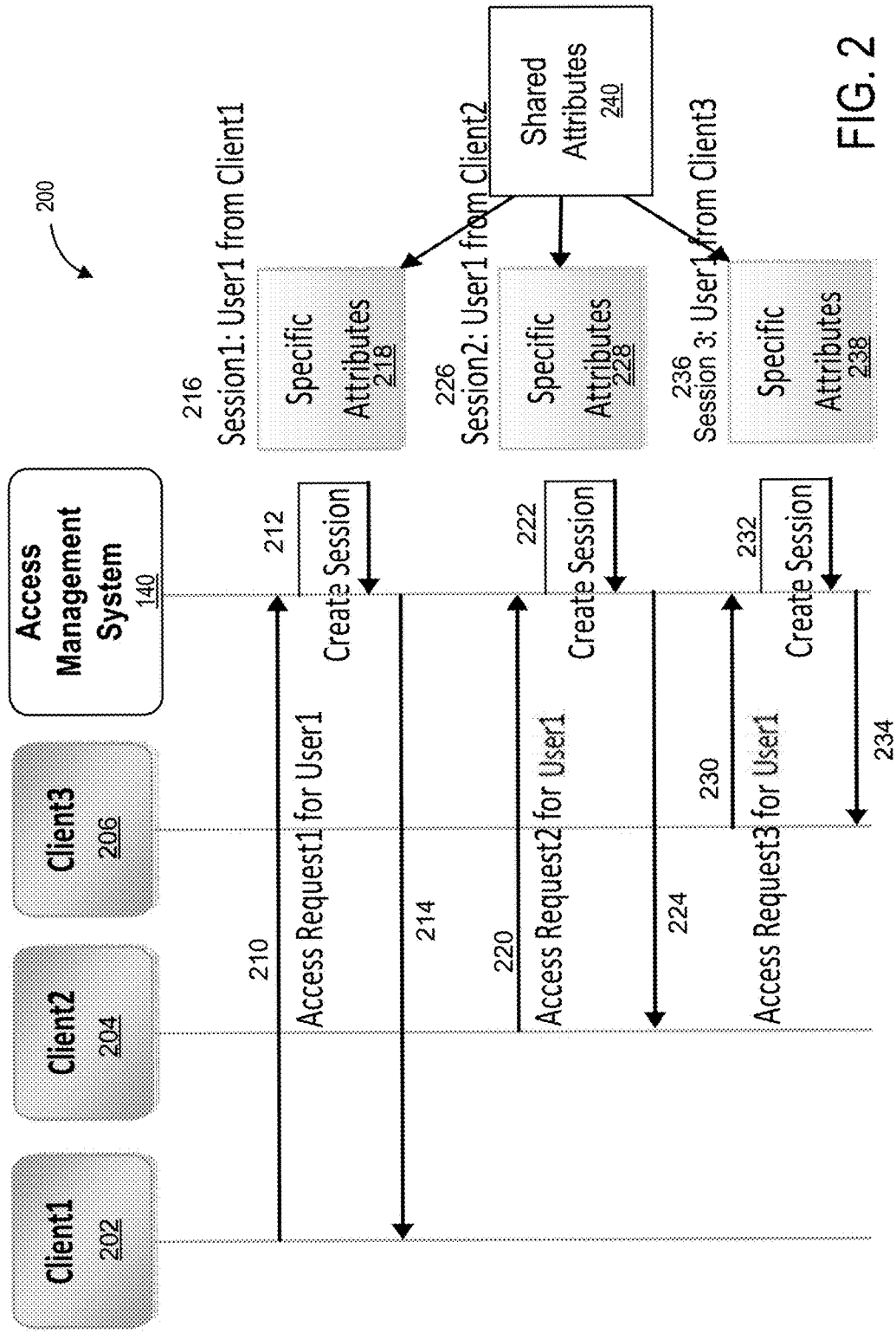
FIGS. 2 and 3 illustrate sequence diagrams processes for managing session information, in accordance with an embodiment.
Figure 3:
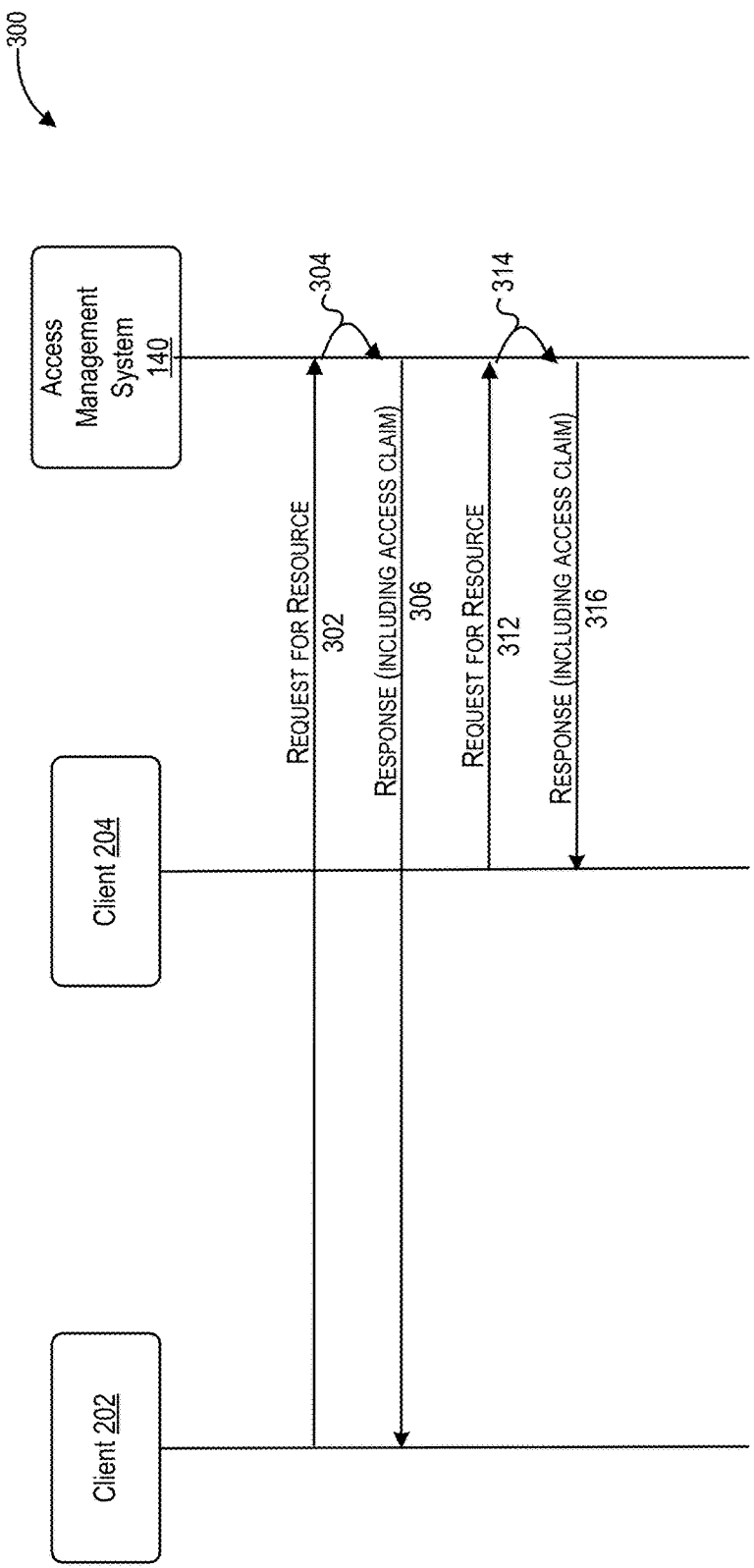
Figure 4:
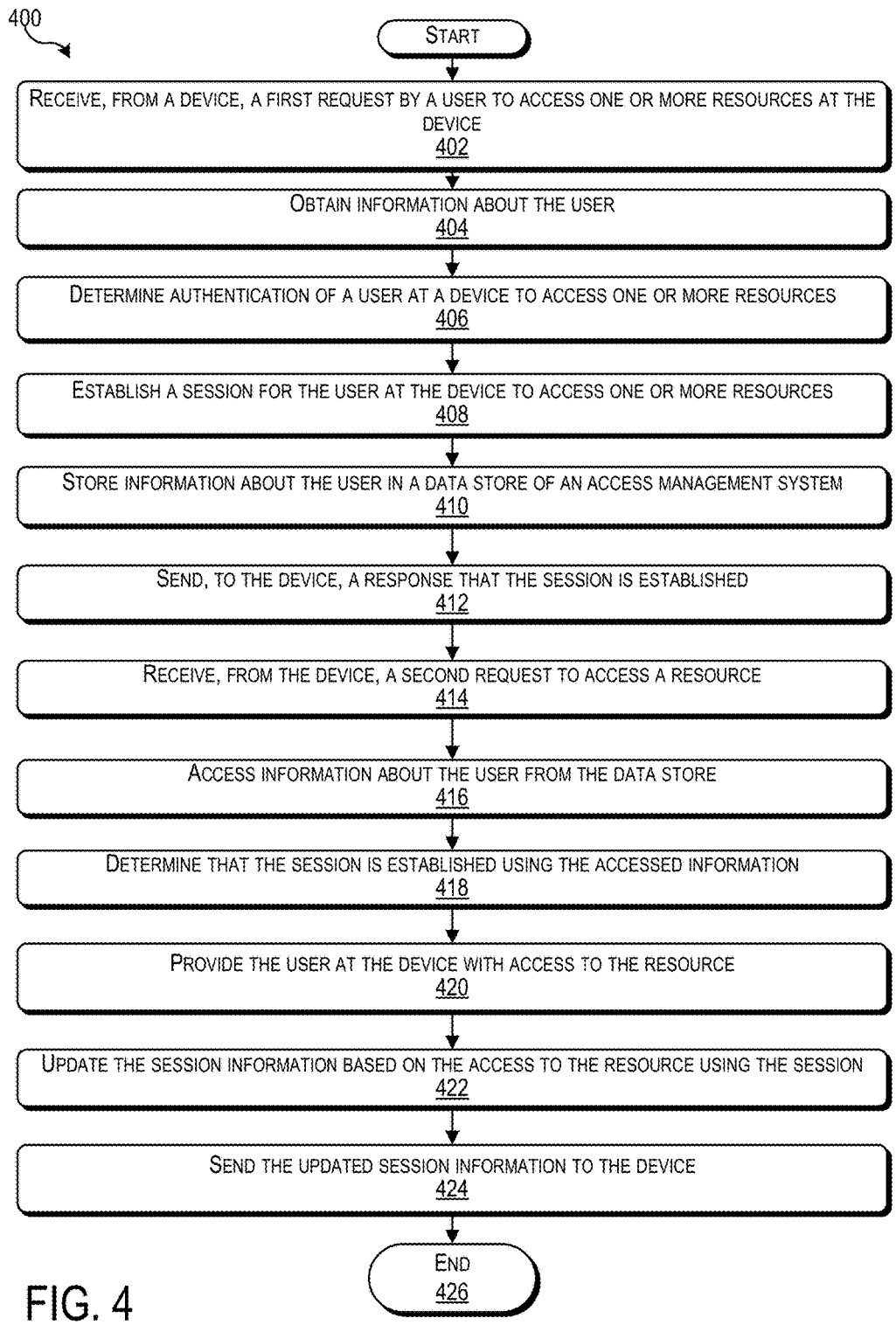
FIG. 4 illustrates a flowchart of a process for managing session information, in accordance with an embodiment.

The following operations in FIGS. 2-4 illustrate various exemplary embodiments by which access management system 140 can manage session information. Session information may be managed using the techniques disclosed herein to minimize computer performance issues for managing data about sessions. With the growth in mobile devices, users are increasingly accessing resources from many devices at any given time. The cost of computer resources may be too great for managing session information for multiple sessions across thousands of users.

In some embodiments, such as those described with reference to FIGS. 2-4, may be described as a process which is depicted as a flowchart, a flow diagram, a data flow diagram, a structure diagram, a sequence diagram, or a block diagram. Although a sequence diagram or a flowchart may describe the operations as a sequential process, many of the operations may be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination may correspond to a return of the function to the calling function or the main function.

The processes depicted herein, such as those described with reference to FIGS. 2 and 3, may be implemented in software (e.g., code, instructions, program) executed by one or more processing units (e.g., processors cores), hardware, or combinations thereof. The software may be stored in a memory (e.g., on a memory device, on a non-transitory computer-readable storage medium). In some embodiments, the processes depicted in flowcharts herein can be implemented by a computing system of an access management system, e.g., access management system 140 of FIG. 1. The particular series of processing steps in this disclosure are not intended to be limiting. Other sequences of steps may also be performed according to alternative embodiments. For example, alternative embodiments of the present disclosure may perform the steps outlined above in a different order. Moreover, the individual steps illustrated in the figures may include multiple sub-steps that may be performed in various sequences as appropriate to the individual step. While processing depicted in FIGS. 2-4 may be described with respect to accessing a single session by a user from multiple clients, such processing may be performed for multiple sessions, such that session information may be managed for multiple sessions for multiple users. Processing depicted in FIGS. 2-4 may be described with respect to multiple sessions, each for which session information may be managed. Furthermore, additional steps may be added or removed depending on the particular applications. One of ordinary skill in the art would recognize many variations, modifications, and alternatives.

In an aspect of some embodiments, each process in FIGS. 2-4 can be performed by one or more processing units. A processing unit may include one or more processors, including single core or multicore processors, one or more cores of processors, or combinations thereof. In some embodiments, a processing unit can include one or more special purpose co-processors such as graphics processors, digital signal processors (DSPs), or the like. In some embodiments, some or all of processing units can be implemented using customized circuits, such as application specific integrated circuits (ASICs), or field programmable gate arrays (FPGAs).

FIG. 2 illustrates a sequence diagram showing operations 200 for managing session information, in accordance with an embodiment. Specifically, the operations 200 may be performed by some or all of the elements shown with respect to FIG. 1. The examples shown in FIGS. 2 and 3 are with respect to a single user operating each of client 202 (e.g., "client1"), client 204 (e.g., "client2"), and client 206 (e.g., "client3"). For purposes of explanation, a client in FIGS. 2 and 3 is a device; however, a client can be a device or an application on a device.

Access management system 140 may store and persist session information in a distributed storage system. The distributed storage system may include one or more memory devices implemented as a cache for fast read and write operations. In a distributed environment where multiple computing devices are distributed as a cluster of computing nodes, each corresponding to a computing device, for an access management system, the distributed cache system provides high performance for computing nodes in the cluster.

Access management system 140 may designate session information for a session into two different categories: 1) session information that does not change often or that rarely changes during an active session; and 2) session information that changes frequently during an active session. Session information may be designated for management based on one or more criteria. The criteria may be configurable and adjusted based on assessment of processing performance and/or availability of resources.

To create subject information upon establishing an access session, an identity store may be accessed for a subject, which may have the attributes of user as well as group membership information of the user. As the subject information changes less frequently, the possibility of a change in the subject information is not likely. Access management system 140 may store subject information in a data store, such as a highly distributed cache optimized for current reads for multiple sessions. The session information may be stored based on identity store name and a dataset name. During subsequent accesses the subject will be retrieved from session data stored by access management system 140, such that access to identity store may not be necessary. Avoiding access to the identity store can reduce or eliminate querying the identity store during subsequent access using an existing session. Information about a subject is an example of information that does not change often. If access for a user is locked, then the session data stored may be updated by access management system 140 to indicate that the account is locked.

To minimize perform overhead, access management system 140 may split session information into two categories: 1) data in session that does not change or changes rarely during the lifetime of a server side session; and) data in session that changes frequently during lifetime of a server side session. Examples of data that does not change or rarely changes is subject information for a user (e.g., authenticated user subject information) that may remain status across multiple sessions for the user. Depending on the category of session data, session data may be stored differently thereby reducing performance overhead for storage and access of session data.

Data about a session that changes frequently and may be specific to a session may be stored different than data that does not change frequently. In some embodiments, session data that changes frequently can be stored in scalable, distributed cache that is optimized for frequent updates. In some embodiments, data that changes frequently can be managed such that access management system 140 passes it to the client (e.g., user-agent or device), which can pass the information back to access management system 140 in a request for access. Access management system, can reconstruct and identify a session based on the data that is received back from the client.

In some embodiments, rarely changing data may be stored in a highly scalable, distributed cache. The distributed optimized for distributed reads. In the example shown in FIG. 2, common attributes 240 (e.g., subject information) may be stored in a highly distributed cache that is accessible by access management system 140. Common attributes 240 may be stored for a user having multiple access sessions, session 216 ("session 1"), session 226 ("session 2"), and session 236 ("session 3"), from client 202, client 204, and client 206, respectively. Because common attributes 222 changes rarely, such information may be accessed once from an identity store and stored locally in distributed cache. If access for a user is locked, then the cache may be updated by access management system 140 to indicate that the account is locked for the subject, thereby minimizing updates for multiple sessions.

Now turning to the example in FIG. 2, a user ("User1") may operate a first client 202 ("client1") to establish a session 216 ("session1") for access. Access management system 140 may manage access to resources from any one of the clients 202, 204, 206 operated by a user.

At step 210, Client 202 may request access for User1. The request may be for access to one or more resources. At step 212, access management system 140, may determine whether a user was previously authenticated for access at a client. If access is managed according to techniques for SSO, then access management system 140 may determine whether the user was authenticated at any client. Access management system 140 may communicate with client 202 to request and obtain credentials to authenticate User1 if User1 is determined to not be authenticated. User1 may not be authenticated upon expiration of access according to one or more criteria for access management. Upon successful authentication of User1, access management system 140 may create session 216 ("session1"). As part of creating the session, access management system 140 may store session data 218 ("specific attributes") that includes information, such as specific attributes about the session. Specific attributes may include information identified as changing frequently, such as list of partners accessed in session, IP Address of the client device, authentication level, authentication scheme, authentication timestamp, and application domain information for accessed resources. The specific attributes, such as access timestamp, partner information of a last accessed resource, and application domain information for one or more accessed resources, may be updated each time User1 requests access (e.g., request authorization for a resource or request authentication for a session).

In some embodiments, specific attributes may be stored using a variety of techniques to improve processing performance for access management system 140, by reducing an amount and type of operations for data that changes frequently. For example, access management system 140 may utilize a distributed, highly scalable cache for frequent updates to reduce the impact of processing based on frequent operations to store and retrieve. In another example, access management system 140 may limit storage of session information to information that does not change frequently, such as common attributes. Access management system 140 can access the common attributes when needed for each session. Information that changes frequently may be sent to a client with access information (e.g., a token). Session information corresponding to specific attributes may not be stored locally by access management system 140 may be sent to the client with information (e.g., a token) related to access for a session. The information may be an access claim, such that the client is provided with access based on providing the specific attributes along with the information related to access for a session.

After session1 is created, at step 214, access management system 140 may send a response ("signed access claim") including a portion of the session information, such as specific attributes 218, to client 202. The response may be pre-defined. The signed access claim may include an identity store identifier and/or a domain name (DN) identifier of the authenticated user so access management system 140 can retrieve the common attributes 240 for a session when needed. Client 202 may store information in the signed access claim locally at client 202 for subsequent access requests. Client 202, on subsequent requests, can send the signed access claim to access management system 140. Access management system 140, when updating or establishing a new session, can use the signed access claim to identify common attributes for the session. The information in the signed access claim may be used to retrieve the common attributes from the common store for the sessions.

After session1 216 is created, User1 may continue to operate client 202 to access resources using session1 216. Upon each subsequent access for a resource, client 202 may send access information including a signed access claim to utilize the session1 216. Access management system 140 may use the signed access claim to recreate the session information for session 1 216. The specific attributes for the session information may be recreated based on the signed access claim included in the access information for a subsequent request. The specific attributes may be updated upon a subsequent access using session1 216. The specific attributes may be sent back to client 202 as a signed access claim with information about the request for access. Since the specific attributes may not be stored by access management system 140, access management system 140 may not incur performance overhead for storing the information and distributed locking may not need to be implemented since the specific attributes for each session are not stored centrally by access management system 140.

After session1 216 is created, User1 may operate a second client 204 ("client2") to establish a session 226 ("session2") for access. At step 220, Client 204 may request access for User1. At step 222, access management system 140, may upon verification of User1's credentials, create session2 226. Access management system 140 may determine authentication of User1 for session 2 226 based on a previous authentication when SSO is implemented. As part of creating the session2 226, access management system 140 may store session data 228 ("specific attributes") that includes information, such as specific attributes about the session2 226. However, since a previous session (e.g., session 216) was created, common attributes 240 for a session have been retrieved and stored in a distributed cache. To minimize performance overhead, access management system 140 may access or reference the common attributes 240 to create session2 226. For the new session, session2 226, access management system may determine specific attributes 228. Frequently changing session information, such as specific attributes 228, for session2 226 may be stored locally for frequent updates. At step 224, access management system 140 may send a response to client 204 ("signed access claim"). The response may include the specific attributes and the information identifying the common attributes 240 (e.g., identity store identifier or DN identifier). Similar to session 216, access management system 140 can find common attributes when client 204 sends the signed access claim with a request for access.

After session2 is created, User1 may operate a third client 206 ("client3") to establish a session 236 ("session3") for access. At step 230, Client 206 may request access for User1. At step 232, access management system 140, may upon verification of User1's credentials, create session3 236. Access management system 140 may determine authentication of User1 for session 3 236 based on a previous authentication when SSO is implemented. As part of creating the session3 236, access management system 140 may store session data 238 ("specific attributes") that includes information, such as specific attributes about the session3 236. However, since a previous session (e.g., session 216) was created, common attributes for a session have been retrieved and stored in a distributed cache. To minimize performance overhead, access management system 140 may access or reference the common attributes 240 to create session3 236. Frequently changing session information, such as specific attributes 238, for session3 236 may be stored locally for frequent updates. At step 234, access management system 140 may send a response to client 206 ("signed access claim"). The response may include the specific attributes 238. Similar to session 216 and session2 226, access management system 140 can find common attributes when client 206 sends the signed access claim with a request for access.

With this approach, there is common information may not be stored per session for a unique user. Access management system 140 may limit storage of session information to a single instance regardless of the number of sessions created for the same user across one or more clients. If server side session usage tracking is required, then a minimalist session per user login can be created which would refer to common subject information. This will reduce the storage and access footprint at access management system 140 to a great extent and optimize memory utilization of access management system 140. The frequently changing session information may not need to be stored locally and can instead be obtained from a signed access claim, which can be used to reconstruct a session in combination with the common attributes 240.

Now turning to FIG. 3 is a sequence diagram showing operations 300 for managing session information, in accordance with an embodiment. FIG. 3 shows how access management system 140 can manage session information to reduce memory storage and minimize storage footprint for multiple sessions, especially, in a distributed computing environment. Elements in FIG. 3 may be referenced from figures in this disclosure.

The example shown in FIG. 3 continues from the examples in FIG. 2. At step 302, client 202 may request access to a resource via an access management system 140. The request may include an access claim that was sent to the client previously after a previous access (e.g., when a session was established). An access claim may include session information that changes frequently such as disclosed above. An access claim may include an identifier of a data store including subject information about a user. An access claim may include user access information (e.g., a domain name of a user) that is part of session information that does not change frequently. At step 304, access management system 140 may determine whether a session was established. The access claim may be used to reconstruct session information for a session. Access management system 140 may access a distributed cache where rarely changing subject information is stored. Using the identifier in the access claim, access management system 140 may identify subject information from the cache. The session may be reconstructed using the session information in the access claim.

When a session does not exist for a resource, access management system 140 may establish a session based on the subject information. A new access claim may be created for the session.

Access management system 140 may update the session information in the access claim upon accessing a resource for the session. The session information may also be updated if the access management system 140 requests credential information from client 202 for reauthentication or step-up authentication. The updated session information may be updated to the access claim.

In some embodiments, if access is locked for a user, the subject information in the cache may be updated to indicate that access is locked. Upon subsequent requests for access, the subject information may indicate that the access is locked such that no client can obtain access until the account is unlocked. When the account is unlocked, the cache may be updated for the subject information. Thus, a single source of the subject information reduces overhead in distributed locking or delays in access concurrently for different clients.

At step 306, access management system 140 may send the updated access claim or a new access claim to client 202 for storage. In this case updating the access claim and sending it back to the client 202 may not cause any performance overhead since distributed locking may not be used.

Similarly, at step 312, client 204 may request access to a resource. The request may include an access claim sent from access management system 140 to client 204 for a previous access. As explained above for step 304, at step 314, access management system may use the access claim to obtain the subject information from the cache. All the sessions will be referring to subject information which can be retrieved from cache. Even if same user logs-in from different clients/devices, only single subject information will be available in the cache; which will be shared by all sessions of same user. Also this same identity store information and user DN will be part of all the access claims for a user.

Access management system 140 can determine session status based on the access claim. Access management system 140 can determine whether the account of the user is locked based on the subject information. If necessary, access management system 140 can determine the session based on the access claim, and if necessary establish a new session. Access management can determine authorization and whether additional credentials are necessary. The access claim can be updated based on the session activity.

At step 316, access management system can send a response including the access claim with updates to the session information.

Now turning to FIG. 4, is a flowchart 400 of a process for managing session information according to some embodiments. Flowchart 400 may be implemented by access management system 140 of FIG. 1.

Flowchart 400 may begin at step 402 by receiving a request by a user to access one or more resources at the device. At step 404, information (e.g., subject information) about the user is obtained from a data store of an access management system. The data store can be implemented as a cache accessible in a distributed manner to the access management system. The information may include user identity information. The user identify information may include user access information such as a domain name of the user.

At step 406, authentication of the user to access one or more resources may be determined. At step 408, using information about the user obtained from an identity data store and based on authentication of the user for access to one or more resources, a session for a user of a device is established to access one or more resources. The session information is generated for one or more attributes of the session. The session information may include a list of partners accessed in session, an Internet protocol (IP) address of the device, an authentication level of the session, an authentication scheme of the session, an authentication timestamp of the session, application domain information for one or more accessed resources using the session, or combinations thereof.

At step 410, information about the user is stored in a data store of the access management system. The information is associated with an identifier. At step 412, a response about the session that is established is sent to the device. The response includes the session information, the identifier, and the user access information. The identifier may indicate an identification of the data store. The response may include an access token generated to enable access to the session. At step 414, a request for access to a resource is received from the device. The request includes the session information, the identifier, and the user access information. The request may include the access token. At step 416, based on the identifier and the user access information, the information about the user is accessed from the data store. At step 418, based on the session information and the information accessed from the data store, the session established for the user is determined. At step 420, based on authorization of the user to access the resource, the user is provided at the device with access to the resource based on the determined session. At step 422, the session information is updated based on the access to the resource using the session. At step 424, the updated session information is sent to the device.

In some embodiments, based on the information accessed about the user, access by the session is determined to be locked. Instead of providing the user with access to the resource, the user may be denied at the device with access to the resource based on the determined session.

In some embodiments, the request at step 414 is a first request. The session is a first session. The device is a first device. The session information is first session information. Flowchart may include establishing a second session for the user to access the resource at a second device. A response may be sent to the second device about the second session that is established. The response includes second session information, the identifier, and the user access information. A second request may be received from the second device for access to the resource, the request including the second session information, the identifier, and the user access information. Based on the identifier and the user access information in the second request, the information about the user may be accessed from the data store. Based on the second session information and the information accessed from the data store, the second session may be determined as established for the user. Based on authorization of the user to access the resource, the user may be provided at the second device with access to the resource based on the determined second session. The second session information may be updated based on the access to the resource using the second session. The updated second session information may be sent to the second device. In some embodiments, based on the information about the user, a determine is made that access by the second session is locked. Instead of providing the second device with access to the resource, the user at the second device may be denied with access to the resource based on the determined second session.

In some embodiments, the request at step 414 is a first request. The resource is a first resource. A second request by the user at the device may be received to access a second resource, the second request including the session information, the identifier, and the user access information. Based on the identifier and the user access information in the second request, the information about the user may be accessed from the data store. Based on the session information and the information accessed from the data store, the session established for the user may be determined. Based on authorization of the user to access the second resource, the user at the device may be provided with access to the second resource based on the determined session. The session information may be updated based on the access to the second resource using the session. The updated session information based on the access to the second resource may be sent to the second device. In some embodiments, a determination is made that access to the second resource is based on additional authentication of the user. The session information may be updated for the second resource to indicate the additional authentication.

Flowchart 400 may end at step 426.

Figure 5:
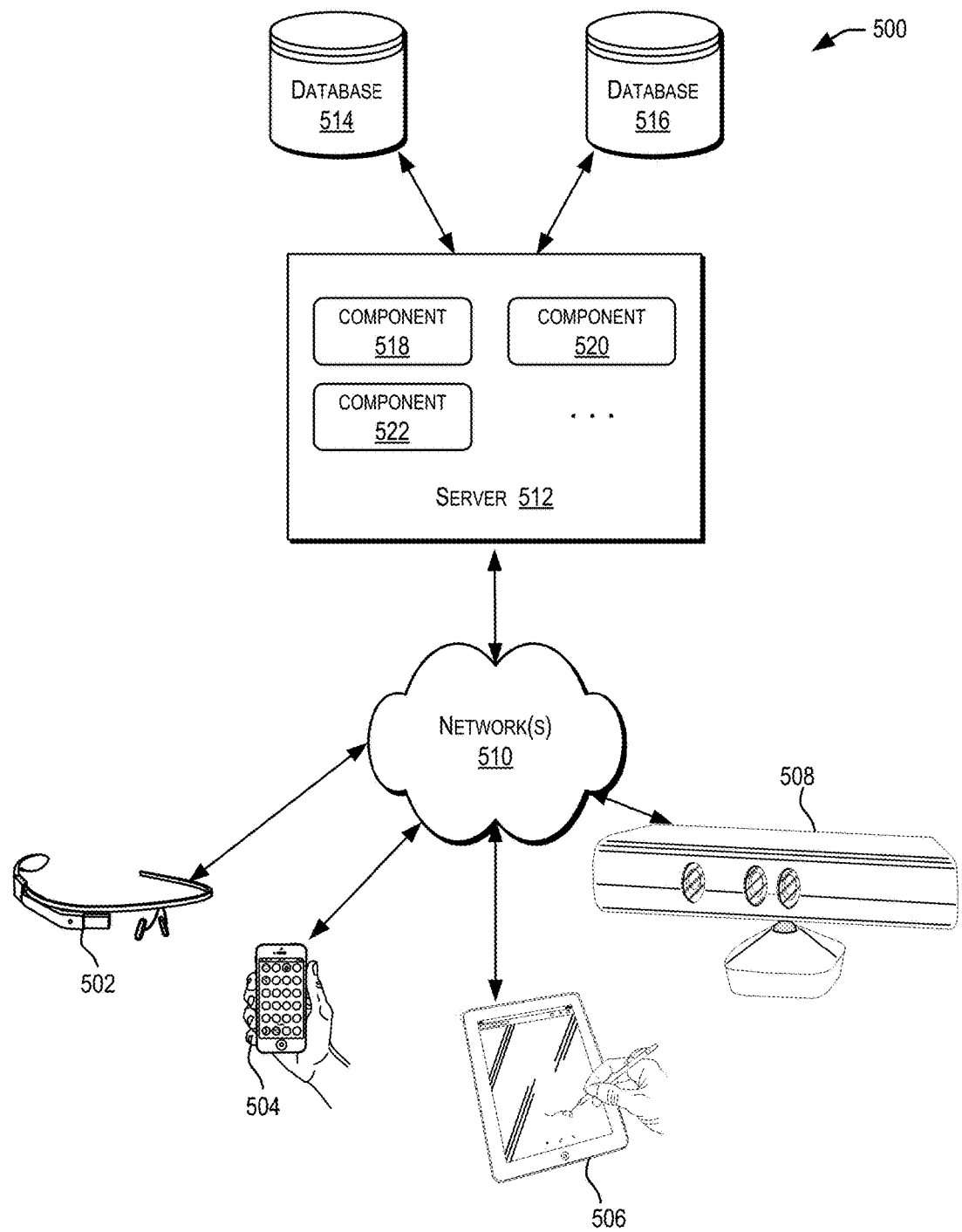
FIG. 5 depicts a simplified diagram of a distributed system for implementing an embodiment.

FIG. 5 depicts a simplified diagram of a distributed system 500 for implementing an embodiment. In the illustrated embodiment, distributed system 500 includes one or more client computing devices 502, 504, 506, and 508, which are configured to execute and operate a client application such as a web browser, proprietary client (e.g., Oracle Forms), or the like over one or more network(s) 510. Server 512 may be communicatively coupled with remote client computing devices 502, 504, 506, and 508 via network 510.

In various embodiments, server 512 may be adapted to run one or more services or software applications. In certain embodiments, server 512 may also provide other services or software applications can include non-virtual and virtual environments. In some embodiments, these services may be offered as web-based or cloud services or under a Software as a Service (SaaS) model to the users of client computing devices 502, 504, 506, and/or 508. Users operating client computing devices 502, 504, 506, and/or 508 may in turn utilize one or more client applications to interact with server 512 to utilize the services provided by these components.

In the configuration depicted in FIG. 5, software components 518, 520 and 522 of system 500 are shown as being implemented on server 512. In other embodiments, one or more of the components of system 500 and/or the services provided by these components may also be implemented by one or more of the client computing devices 502, 504, 506, and/or 508. Users operating the client computing devices may then utilize one or more client applications to use the services provided by these components. These components may be implemented in hardware, firmware, software, or combinations thereof. It should be appreciated that various different system configurations are possible, which may be different from distributed system 500. The embodiment shown in FIG. 5 is thus one example of a distributed system for implementing an embodiment system and is not intended to be limiting.

Client computing devices 502, 504, 506, and/or 508 may include various types of computing systems. For example, a client computing device may include portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 10, Palm OS, and the like. The devices may support various applications such as various Internet-related apps, e-mail, short message service (SMS) applications, and may use various other communication protocols. The client computing devices may also include general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Client computing devices may also include electronic devices such as a thin-client computer, an Internet-enabled gaming system (e.g., a Microsoft Xbox gaming console with or without a Kinect® gesture input device), and/or a personal messaging device, capable of communicating over network(s) 510.

Although distributed system 500 in FIG. 5 is shown with four client computing devices, any number of client computing devices may be supported. Other devices, such as devices with sensors, etc., may interact with server 512.

Network(s) 510 in distributed system 500 may be any type of network familiar to those skilled in the art that can support data communications using any of a variety of available protocols, including without limitation TCP/IP (transmission control protocol/Internet protocol), SNA (systems network architecture), IPX (Internet packet exchange), AppleTalk, and the like. Merely by way of example, network(s) 510 can be a local area network (LAN), networks based on Ethernet, Token-Ring, a wide-area network, the Internet, a virtual network, a virtual private network (VPN), an intranet, an extranet, a public switched telephone network (PSTN), an infra-red network, a wireless network (e.g., a network operating under any of the Institute of Electrical and Electronics (IEEE) 802.11 suite of protocols, Bluetooth®, and/or any other wireless protocol), and/or any combination of these and/or other networks.

Server 512 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. Server 512 can include one or more virtual machines running virtual operating systems, or other computing architectures involving virtualization. One or more flexible pools of logical storage devices can be virtualized to maintain virtual storage devices for the server. Virtual networks can be controlled by server 512 using software defined networking. In various embodiments, server 512 may be adapted to run one or more services or software applications described in the foregoing disclosure. For example, server 512 may correspond to a server for performing processing as described above according to an embodiment of the present disclosure.

Server 512 may run an operating system including any of those discussed above, as well as any commercially available server operating system. Server 512 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle, Microsoft, Sybase, IBM (International Business Machines), and the like.

In some implementations, server 512 may include one or more applications to analyze and consolidate data feeds and/or event updates received from users of client computing devices 502, 504, 506, and 508. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 512 may also include one or more applications to display the data feeds and/or real-time events via one or more display devices of client computing devices 502, 504, 506, and 508.

Distributed system 500 may also include one or more databases 514 and 516. These databases may provide a mechanism for storing information such as user interactions information, usage patterns information, adaptation rules information, and other information used by embodiments of the present disclosure. Databases 514 and 516 may reside in a variety of locations. By way of example, one or more of databases 514 and 516 may reside on a non-transitory storage medium local to (and/or resident in) server 512. Alternatively, databases 514 and 516 may be remote from server 512 and in communication with server 512 via a network-based or dedicated connection. In one set of embodiments, databases 514 and 516 may reside in a storage-area network (SAN). Similarly, any necessary files for performing the functions attributed to server 512 may be stored locally on server 512 and/or remotely, as appropriate. In one set of embodiments, databases 514 and 516 may include relational databases, such as databases provided by Oracle that are adapted to store, update, and retrieve data in response to SQL-formatted commands.

Figure 6:
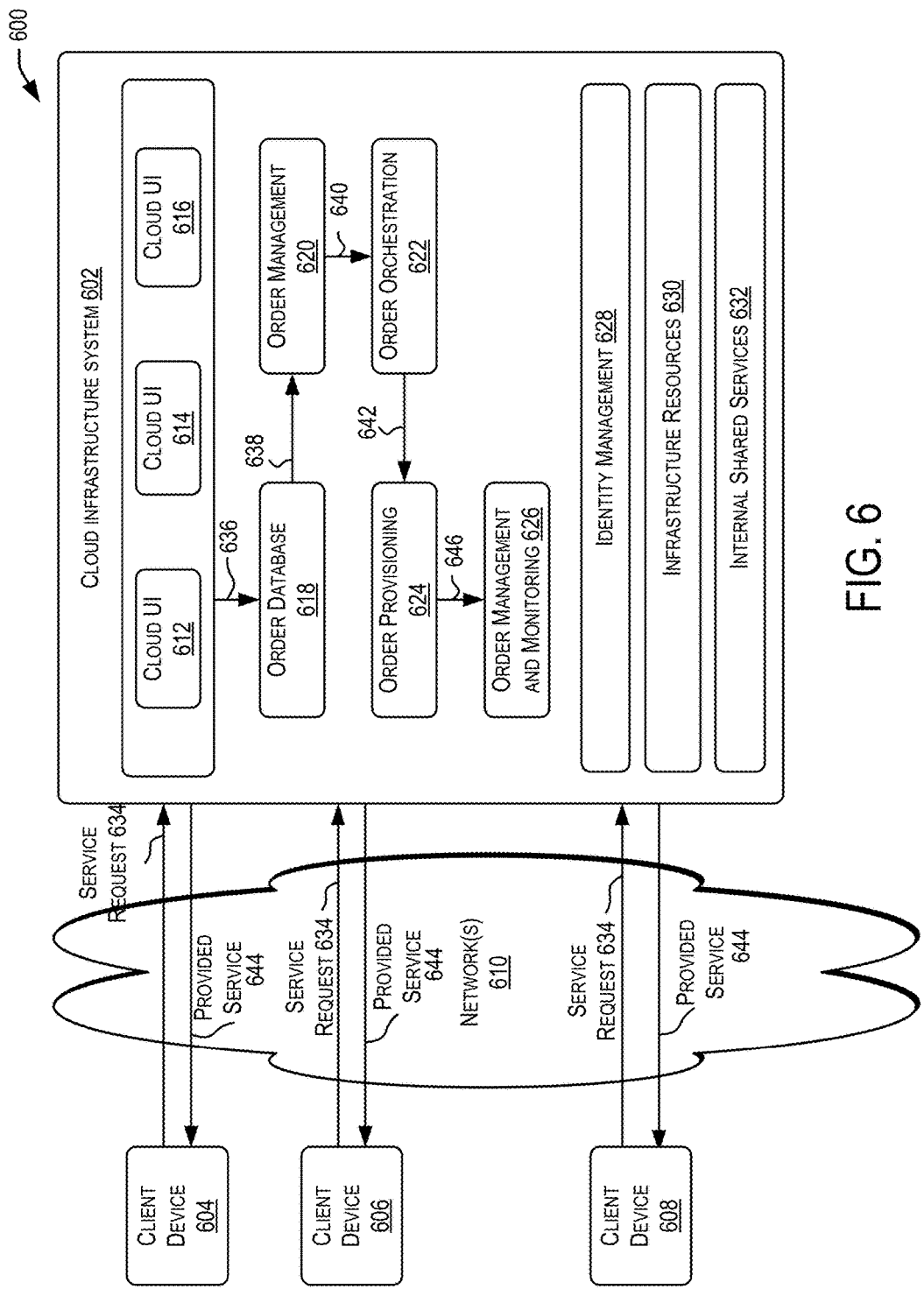
FIG. 6 illustrates a simplified block diagram of one or more components of a system environment in which services may be offered as cloud services, in accordance with an embodiment of the present disclosure.

In some embodiments, a cloud environment may provide one or more services. FIG. 6 is a simplified block diagram of one or more components of a system environment 600 in which services may be offered as cloud services, in accordance with an embodiment of the present disclosure. In the illustrated embodiment in FIG. 6, system environment 600 includes one or more client computing devices 604, 606, and 608 that may be used by users to interact with a cloud infrastructure system 602 that provides cloud services. Cloud infrastructure system 602 may comprise one or more computers and/or servers that may include those described above for server 512.

It should be appreciated that cloud infrastructure system 602 depicted in FIG. 6 may have other components than those depicted. Further, the embodiment shown in FIG. 6 is only one example of a cloud infrastructure system that may incorporate an embodiment of the disclosure. In some other embodiments, cloud infrastructure system 602 may have more or fewer components than shown in the figure, may combine two or more components, or may have a different configuration or arrangement of components.

Client computing devices 604, 606, and 608 may be devices similar to those described above for client computing devices 502, 504, 506, and 508. Client computing devices 604, 606, and 608 may be configured to operate a client application such as a web browser, a proprietary client application (e.g., Oracle Forms), or some other application, which may be used by a user of the client computing device to interact with cloud infrastructure system 602 to use services provided by cloud infrastructure system 602. Although exemplary system environment 600 is shown with three client computing devices, any number of client computing devices may be supported. Other devices such as devices with sensors, etc. may interact with cloud infrastructure system 602.

Network(s) 610 may facilitate communications and exchange of data between client computing devices 604, 606, and 608 and cloud infrastructure system 602. Each network may be any type of network familiar to those skilled in the art that can support data communications using any of a variety of commercially-available protocols, including those described above for network(s) 510.

In certain embodiments, services provided by cloud infrastructure system 602 may include a host of services that are made available to users of the cloud infrastructure system on demand. Various other services may also be offered including without limitation online data storage and backup solutions, Web-based e-mail services, hosted office suites and document collaboration services, database processing, managed technical support services, and the like. Services provided by the cloud infrastructure system can dynamically scale to meet the needs of its users.

In certain embodiments, a specific instantiation of a service provided by cloud infrastructure system 602 may be referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain embodiments, cloud infrastructure system 602 may include a suite of applications, middleware, and database service offerings that are delivered to a customer in a self-service, subscription-based, elastically scalable, reliable, highly available, and secure manner. An example of such a cloud infrastructure system is the Oracle Public Cloud provided by the present assignee.

Cloud infrastructure system 602 may also provide "big data" elated computation and analysis services. The term "big data" is generally used to refer to extremely large data sets that can be stored and manipulated by analysts and researchers to visualize large amounts of data, detect trends, and/or otherwise interact with the data. This big data and related applications can be hosted and/or manipulated by an infrastructure system on many levels and at different scales. Tens, hundreds, or thousands of processors linked in parallel can act upon such data in order to present it or simulate external forces on the data or what it represents. These data sets can involve structured data, such as that organized in a database or otherwise according to a structured model, and/or unstructured data (e.g., emails, images, data blobs (binary large objects), web pages, complex event processing). By leveraging an ability of an embodiment to relatively quickly focus more (or fewer) computing resources upon an objective, the cloud infrastructure system may be better available to carry out tasks on large data sets based on demand from a business, government agency, research organization, private individual, group of like-minded individuals or organizations, or other entity.

In various embodiments, cloud infrastructure system 602 may be adapted to automatically provision, manage and track a customer's subscription to services offered by cloud infrastructure system 602. Cloud infrastructure system 602 may provide the cloud services via different deployment models. For example, services may be provided under a public cloud model in which cloud infrastructure system 602 is owned by an organization selling cloud services (e.g., owned by Oracle Corporation) and the services are made available to the general public or different industry enterprises. As another example, services may be provided under a private cloud model in which cloud infrastructure system 602 is operated solely for a single organization and may provide services for one or more entities within the organization. The cloud services may also be provided under a community cloud model in which cloud infrastructure system 602 and the services provided by cloud infrastructure system 602 are shared by several organizations in a related community. The cloud services may also be provided under a hybrid cloud model, which is a combination of two or more different models.

In some embodiments, the services provided by cloud infrastructure system 602 may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 602. Cloud infrastructure system 602 then performs processing to provide the services in the customer's subscription order.

In some embodiments, the services provided by cloud infrastructure system 602 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and business flexibility for large organizations.

In some embodiments, platform services may be provided by cloud infrastructure system 602 via a PaaS platform. The PaaS platform may be configured to provide cloud services that fall under the PaaS category. Examples of platform services may include without limitation services that enable organizations (such as Oracle) to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by cloud infrastructure system 602 without the need for customers to purchase separate licenses and support. Examples of platform services include, without limitation, Oracle Java Cloud Service (JCS), Oracle Database Cloud Service (DBCS), and others.

By utilizing the services provided by the PaaS platform, customers can employ programming languages and tools supported by the cloud infrastructure system and also control the deployed services. In some embodiments, platform services provided by the cloud infrastructure system may include database cloud services, middleware cloud services (e.g., Oracle Fusion Middleware services), and Java cloud services. In one embodiment, database cloud services may support shared service deployment models that enable organizations to pool database resources and offer customers a Database as a Service in the form of a database cloud. Middleware cloud services may provide a platform for customers to develop and deploy various business applications, and Java cloud services may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain embodiments, cloud infrastructure system 602 may also include infrastructure resources 630 for providing the resources used to provide various services to customers of the cloud infrastructure system. In one embodiment, infrastructure resources 630 may include pre-integrated and optimized combinations of hardware, such as servers, storage, and networking resources to execute the services provided by the PaaS platform and the SaaS platform, and other resources.

In some embodiments, resources in cloud infrastructure system 602 may be shared by multiple users and dynamically re-allocated per demand. Additionally, resources may be allocated to users in different time zones. For example, cloud infrastructure system 602 may enable a first set of users in a first time zone to utilize resources of the cloud infrastructure system for a specified number of hours and then enable the re-allocation of the same resources to another set of users located in a different time zone, thereby maximizing the utilization of resources.

In certain embodiments, a number of internal shared services 632 may be provided that are shared by different components or modules of cloud infrastructure system 602 to enable provision of services by cloud infrastructure system 602. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain embodiments, cloud infrastructure system 602 may provide comprehensive management of cloud services (e.g., SaaS, PaaS, and IaaS services) in the cloud infrastructure system. In one embodiment, cloud management functionality may include capabilities for provisioning, managing and tracking a customer's subscription received by cloud infrastructure system 602, and the like.

In one embodiment, as depicted in FIG. 6, cloud management functionality may be provided by one or more modules, such as an order management module 620, an order orchestration module 622, an order provisioning module 624, an order management and monitoring module 626, and an identity management module 628. These modules may include or be provided using one or more computers and/or servers, which may be general purpose computers, specialized server computers, server farms, server clusters, or any other appropriate arrangement and/or combination.

In an exemplary operation, at step 634, a customer using a client device, such as client computing devices 604, 606 or 608, may interact with cloud infrastructure system 602 by requesting one or more services provided by cloud infrastructure system 602 and placing an order for a subscription for one or more services offered by cloud infrastructure system 602. In certain embodiments, the customer may access a cloud User Interface (UI) such as cloud UI 612, cloud UI 614 and/or cloud UI 616 and place a subscription order via these UIs. The order information received by cloud infrastructure system 602 in response to the customer placing an order may include information identifying the customer and one or more services offered by the cloud infrastructure system 602 that the customer intends to subscribe to.

At step 636, the order information received from the customer may be stored in an order database 618. If this is a new order, a new record may be created for the order. In one embodiment, order database 618 can be one of several databases operated by cloud infrastructure system 618 and operated in conjunction with other system elements.

At step 638, the order information may be forwarded to an order management module 620 that may be configured to perform billing and accounting functions related to the order, such as verifying the order, and upon verification, booking the order.

At step 640, information regarding the order may be communicated to an order orchestration module 622 that is configured to orchestrate the provisioning of services and resources for the order placed by the customer. In some instances, order orchestration module 622 may use the services of order provisioning module 624 for the provisioning. In certain embodiments, order orchestration module 622 enables the management of business processes associated with each order and applies business logic to determine whether an order should proceed to provisioning.

As shown in the embodiment depicted in FIG. 6, at step 642, upon receiving an order for a new subscription, order orchestration module 622 sends a request to order provisioning module 624 to allocate resources and configure resources needed to fulfill the subscription order. Order provisioning module 624 enables the allocation of resources for the services ordered by the customer. Order provisioning module 624 provides a level of abstraction between the cloud services provided by cloud infrastructure system 600 and the physical implementation layer that is used to provision the resources for providing the requested services. This enables order orchestration module 622 to be isolated from implementation details, such as whether or not services and resources are actually provisioned on the fly or pre-provisioned and only allocated/assigned upon request.

At step 644, once the services and resources are provisioned, a notification may be sent to the subscribing customers indicating that the requested service is now ready for use. In some instance, information (e.g. a link) may be sent to the customer that enables the customer to start using the requested services.

At step 646, a customer's subscription order may be managed and tracked by an order management and monitoring module 626. In some instances, order management and monitoring module 626 may be configured to collect usage statistics regarding a customer use of subscribed services. For example, statistics may be collected for the amount of storage used, the amount data transferred, the number of users, and the amount of system up time and system down time, and the like.

In certain embodiments, cloud infrastructure system 600 may include an identity management module 628 that is configured to provide identity services, such as access management and authorization services in cloud infrastructure system 600. In some embodiments, identity management module 628 may control information about customers who wish to utilize the services provided by cloud infrastructure system 602. Such information can include information that authenticates the identities of such customers and information that describes which actions those customers are authorized to perform relative to various system resources (e.g., files, directories, applications, communication ports, memory segments, etc.) Identity management module 628 may also include the management of descriptive information about each customer and about how and by whom that descriptive information can be accessed and modified.

Figure 7:
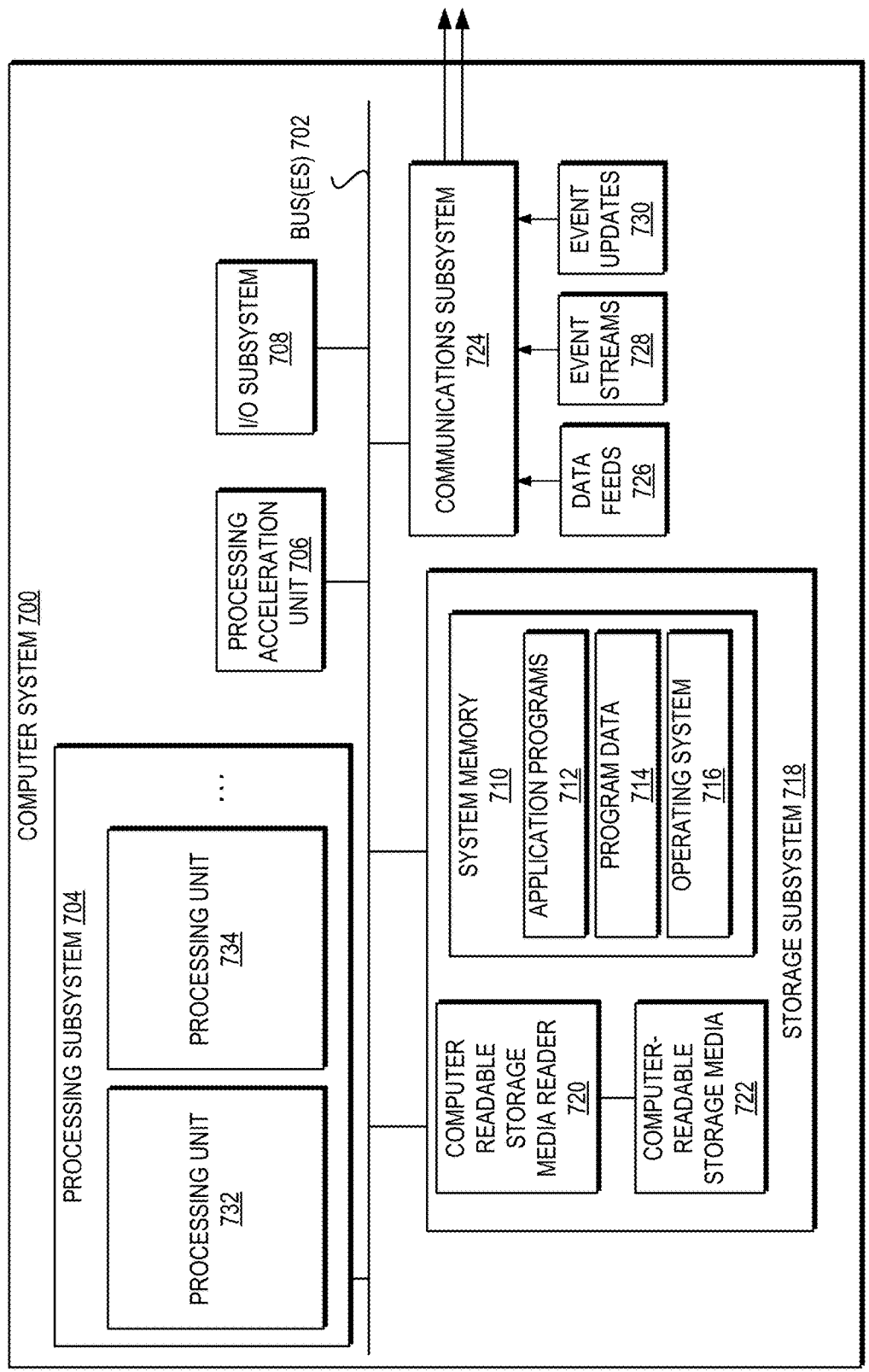
FIG. 7 illustrates an exemplary computer system that may be used to implement an embodiment of the present disclosure.

FIG. 7 illustrates an exemplary computer system 700 that may be used to implement an embodiment of the present disclosure. In some embodiments, computer system 700 may be used to implement any of the various servers and computer systems described above. As shown in FIG. 7, computer system 700 includes various subsystems including a processing unit 704 that communicates with a number of peripheral subsystems via a bus subsystem 702. These peripheral subsystems may include a processing acceleration unit 706, an I/O subsystem 708, a storage subsystem 718 and a communications subsystem 724. Storage subsystem 718 may include tangible computer-readable storage media 722 and a system memory 710.

Bus subsystem 702 provides a mechanism for letting the various components and subsystems of computer system 700 communicate with each other as intended. Although bus subsystem 702 is shown schematically as a single bus, alternative embodiments of the bus subsystem may utilize multiple buses. Bus subsystem 702 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard, and the like.

Processing subsystem 704 controls the operation of computer system 700 and may comprise one or more processing units 732, 734, etc. A processing unit may include be one or more processors, including single core or multicore processors, one or more cores of processors, or combinations thereof. In some embodiments, processing subsystem 704 can include one or more special purpose co-processors such as graphics processors, digital signal processors (DSPs), or the like. In some embodiments, some or all of the processing units of processing subsystem 704 can be implemented using customized circuits, such as application specific integrated circuits (ASICs), or field programmable gate arrays (FPGAs).

In some embodiments, the processing units in processing subsystem 704 can execute instructions stored in system memory 710 or on computer readable storage media 722. In various embodiments, the processing units can execute a variety of programs or code instructions and can maintain multiple concurrently executing programs or processes. At any given time, some or all of the program code to be executed can be resident in system memory 710 and/or on computer-readable storage media 722 including potentially on one or more storage devices. Through suitable programming, processing subsystem 704 can provide various functionalities disclosed herein.

In certain embodiments, a processing acceleration unit 706 may be provided for performing customized processing or for off-loading some of the processing performed by processing subsystem 704 so as to accelerate the overall processing performed by computer system 700.

I/O subsystem 708 may include devices and mechanisms for inputting information to computer system 700 and/or for outputting information from or via computer system 700. In general, use of the term "input device" is intended to include all possible types of devices and mechanisms for inputting information to computer system 700. User interface input devices may include, for example, a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may also include motion sensing and/or gesture recognition devices such as the Microsoft Kinect® motion sensor that enables users to control and interact with an input device, the Microsoft Xbox® 360 game controller, devices that provide an interface for receiving input using gestures and spoken commands. User interface input devices may also include eye gesture recognition devices such as the Google Glass® blink detector that detects eye activity (e.g., "blinking" while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

Other examples of user interface input devices include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 700 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Storage subsystem 718 provides a repository or data store for storing information that is used by computer system 700. Storage subsystem 718 provides a tangible non-transitory computer-readable storage medium for storing the basic programming and data constructs that provide the functionality of some embodiments. Software (programs, code modules, instructions) that when executed by processing subsystem 704 provide the functionality described above may be stored in storage subsystem 718. The software may be executed by one or more processing units of processing subsystem 704. Storage subsystem 718 may also provide a repository for storing data used in accordance with the present disclosure.

Storage subsystem 718 may include one or more non-transitory memory devices, including volatile and non-volatile memory devices. As shown in FIG. 7, storage subsystem 718 includes a system memory 710 and a computer-readable storage media 722. System memory 710 may include a number of memories including a volatile main random access memory (RAM) for storage of instructions and data during program execution and a non-volatile read only memory (ROM) or flash memory in which fixed instructions are stored. In some implementations, a basic input/output system (BIOS), containing the basic routines that help to transfer information between elements within computer system 700, such as during start-up, may typically be stored in the ROM. The RAM typically contains data and/or program modules that are presently being operated and executed by processing subsystem 704. In some implementations, system memory 710 may include multiple different types of memory, such as static random access memory (SRAM) or dynamic random access memory (DRAM).

By way of example, and not limitation, as depicted in FIG. 7, system memory 710 may store application programs 712, which may include client applications, Web browsers, mid-tier applications, relational database management systems (RDBMS), etc., program data 714, and an operating system 716. By way of example, operating system 716 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Computer-readable storage media 722 may store programming and data constructs that provide the functionality of some embodiments. Software (programs, code modules, instructions) that when executed by processing subsystem 704 a processor provide the functionality described above may be stored in storage subsystem 718. By way of example, computer-readable storage media 722 may include non-volatile memory such as a hard disk drive, a magnetic disk drive, an optical disk drive such as a CD ROM, DVD, a Blu-Ray® disk, or other optical media. Computer-readable storage media 722 may include, but is not limited to, Zip® drives, flash memory cards, universal serial bus (USB) flash drives, secure digital (SD) cards, DVD disks, digital video tape, and the like. Computer-readable storage media 722 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. Computer-readable media 722 may provide storage of computer-readable instructions, data structures, program modules, and other data for computer system 700.

In certain embodiments, storage subsystem 700 may also include a computer-readable storage media reader 720 that can further be connected to computer-readable storage media 722. Together and, optionally, in combination with system memory 710, computer-readable storage media 722 may comprehensively represent remote, local, fixed, and/or removable storage devices plus storage media for storing computer-readable information.

In certain embodiments, computer system 700 may provide support for executing one or more virtual machines. Computer system 700 may execute a program such as a hypervisor for facilitating the configuring and managing of the virtual machines. Each virtual machine may be allocated memory, compute (e.g., processors, cores), I/O, and networking resources. Each virtual machine typically runs its own operating system, which may be the same as or different from the operating systems executed by other virtual machines executed by computer system 700. Accordingly, multiple operating systems may potentially be run concurrently by computer system 700. Each virtual machine generally runs independently of the other virtual machines.

Communications subsystem 724 provides an interface to other computer systems and networks. Communications subsystem 724 serves as an interface for receiving data from and transmitting data to other systems from computer system 700. For example, communications subsystem 724 may enable computer system 700 to establish a communication channel to one or more client computing devices via the Internet for receiving and sending information from and to the client computing devices.

Communication subsystem 724 may support both wired and/or wireless communication protocols. For example, in certain embodiments, communications subsystem 724 may include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 724 can provide wired network connectivity (e.g., Ethernet) in addition to or instead of a wireless interface.

Communication subsystem 724 can receive and transmit data in various forms. For example, in some embodiments, communications subsystem 724 may receive input communication in the form of structured and/or unstructured data feeds 726, event streams 728, event updates 730, and the like. For example, communications subsystem 724 may be configured to receive (or send) data feeds 726 in real-time from users of social media networks and/or other communication services such as Twitter® feeds, Facebook® updates, web feeds such as Rich Site Summary (RSS) feeds, and/or real-time updates from one or more third party information sources.

In certain embodiments, communications subsystem 724 may be configured to receive data in the form of continuous data streams, which may include event streams 728 of real-time events and/or event updates 730, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 724 may also be configured to output the structured and/or unstructured data feeds 726, event streams 728, event updates 730, and the like to one or more databases that may be in communication with one or more streaming data source computers coupled to computer system 700.

Computer system 700 can be one of various types, including a handheld portable device (e.g., an iPhone® cellular phone, an iPad® computing tablet, a PDA), a wearable device (e.g., a Google Glass® head mounted display), a personal computer, a workstation, a mainframe, a kiosk, a server rack, or any other data processing system.

Due to the ever-changing nature of computers and networks, the description of computer system 700 depicted in FIG. 7 is intended only as a specific example. Many other configurations having more or fewer components than the system depicted in FIG. 7 are possible. Based on the disclosure and teachings provided herein, a person of ordinary skill in the art will appreciate other ways and/or methods to implement the various embodiments.

Although specific embodiments of the disclosure have been described, various modifications, alterations, alternative constructions, and equivalents are also encompassed within the scope of the disclosure. The modifications include any relevant combination of the disclosed features. Embodiments of the present disclosure are not restricted to operation within certain specific data processing environments, but are free to operate within a plurality of data processing environments. Additionally, although embodiments of the present disclosure have been described using a particular series of transactions and steps, it should be apparent to those skilled in the art that the scope of the present disclosure is not limited to the described series of transactions and steps. Various features and aspects of the above-described embodiments may be used individually or jointly.

Further, while embodiments of the present disclosure have been described using a particular combination of hardware and software, it should be recognized that other combinations of hardware and software are also within the scope of the present disclosure. Embodiments of the present disclosure may be implemented only in hardware, or only in software, or using combinations thereof. The various processes described herein can be implemented on the same processor or different processors in any combination. Accordingly, where components or modules are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for interprocess communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific embodiments have been described, these are not intended to be limiting. Various modifications and equivalents are within the scope of the following claims.

What is claimed is:

1. A method comprising:
   receiving, at a computer system of an access management system, a request for access to a resource, wherein the request is received from a user operating a client device;
   obtaining, by the computer system, user identity information associated with the user from an identity data store of the access management system;
   authenticating, by the computer system, the user to access the resource;
   using the user identity information about the user obtained from the identity data store and based on the authentication of the user for access to the resource, establishing, by the computer system, a session for the user to access the resource, wherein the establishing the session comprises:
      generating session information for the session, wherein the session information includes: (i) common attributes, and (ii) specific attributes, the common attributes include user access information that is shared between sessions, and the specific attributes include information that changes between sessions, and wherein the session information includes one or more of: a list of partners accessed in session, an Internet protocol (IP) address of the client device, an authentication level of the session, an authentication scheme of the session, an authentication timestamp of the session, or application domain information for one or more accessed resources using the session;
      storing the common attributes in a data store of the access management system, wherein the data store is implemented as a cache accessible in a distributed manner to the access management system, and the common attributes are stored associated with an identifier in the cache; and
      sending an access claim to the client device for the session that is established, wherein the access claim includes the specific attributes and the identifier for the common attributes;
   receiving, at the computing system, from the user operating the client device, another request for access to another resource, wherein the another request includes the access claim;
   accessing, from the data store, based on the identifier, the common attributes for the session;
   determining, based on the specific attributes received in the access claim and the common attributes accessed from the data store, the session established for the user;
   based on authorization of the user to access the another resource, providing, by the computer system, the user with access to the another resource using the determined session;
   updating, by the computer system, the session information including the specific attributes for the session based on the access to the another resource using the session; and
   sending, by the computer system, the access claim to the client device for the session that is established, wherein the access claim includes the updated specific attributes and the identifier for the common attributes.

2. The method of claim 1, wherein the access claim is a pre-defined response from the computing system that includes: (i) a portion of the session information including the specific attributes, and (ii) the identifier for the common attributes.

3. The method of claim 2, wherein the pre-defined response further includes an access token, and wherein the another request for access to the another resource includes the access token sent in the response to the client device.

4. The method of claim 2, wherein the pre-defined response further includes a domain name of the user.

5. The method of claim 1, further comprising:
   based on the information accessed about the user, determining that access by the session is locked; and
   denying the user at the device with access to the resource based on the determined session.

6. A system comprising:
   one or more processors; and
   a memory accessible to the one or more processors, the memory storing one or more instructions that, upon execution by the one or more processors, causes the one or more processors to:
   receive a request for access to a resource, wherein the request is received from a user operating a client device;
   obtain user identity information associated with the user from an identity data store of an access management system;
   authenticate the user to access the resource;
   using the user identity information about the user obtained from the identity data store and based on the authentication of the user for access to the resource, establish, by the access management system, a session for the user to access the resource, wherein the establishing the session comprises:
      generating session information for the session, wherein the session information includes: (i) common attributes, and (ii) specific attributes, the common attributes include user access information that is shared between sessions, and the specific attributes include information that changes between sessions, and wherein the session information includes one or more of: a list of partners accessed in session, an Internet protocol (IP) address of the client device, an authentication level of the session, an authentication scheme of the session, an authentication timestamp of the session, or application domain information for one or more accessed resources using the session;
      storing the common attributes in a data store of the access management system, wherein the data store is implemented as a cache accessible in a distributed manner to the access management system, and the common attributes are stored associated with an identifier in the cache; and sending an access claim to the client device for the session that is established, wherein the access claim includes the specific attributes and the identifier for the common attributes;

receive, from the user operating the client device, another request for access to a another resource, wherein the another request includes the access claim;

access, from the data store, based on the identifier, the common attributes for the session;

determine, based on the specific attributes received in the access claim and the common attributes accessed from the data store, the session established for the user;

based on authorization of the user to access the another resource, provide the user with access to the another resource using the determined session;

update the session information including the specific attributes for the session based on the access to the another resource using the session; and send the access claim to the client device for the session that is established, wherein the access claim includes the updated specific attributes and the identifier for the common attributes.

7. The system of claim 6, wherein the access claim is a pre-defined response from the computing system that includes: (i) a portion of the session information including the specific attributes, and (ii) the identifier for the common attributes.

8. The system of claim 7, wherein the pre-defined response further includes an access token, and wherein the another request for access to the another resource includes the access token sent in the response to the client device.

9. A non-transitory computer-readable medium storing one or more instructions that, upon execution by one or more processors, causes the one or more processors to:

receive a request for access to a resource, wherein the request is received from a user operating a client device;

obtain user identity information associated with the user from an identity data store of an access management system;

authenticate the user to access the resource;

using the user identity information about the user obtained from the identity data store and based on the authentication of the user for access to the resource, establish, by the access management system, a session for the user to access the resource, wherein the establishing the session comprises:

generating session information for the session, wherein the session information includes: (i) common attributes, and (ii) specific attributes, the common attributes include user access information that is shared between sessions, and the specific attributes include information that changes between sessions, and wherein the session information includes one or more of: a list of partners accessed in session, an Internet protocol (IP) address of the client device, an authentication level of the session, an authentication scheme of the session, an authentication timestamp of the session, or application domain information for one or more accessed resources using the session;

storing the common attributes in a data store of the access management system, wherein the data store is implemented as a cache accessible in a distributed manner to the access management system, and the common attributes are stored associated with an identifier in the cache; and sending an access claim to the client device for the session that is established, wherein the access claim includes the specific attributes and the identifier for the common attributes;

receive, from the user operating the client device, another request for access to a another resource, wherein the another request includes the access claim;

access, from the data store, based on the identifier, the common attributes for the session;

determine, based on the specific attributes received in the access claim and the common attributes accessed from the data store, the session established for the user;

based on authorization of the user to access the another resource, provide the user with access to the another resource using the determined session;

update the session information including the specific attributes for the session based on the access to the another resource using the session; and send the access claim to the client device for the session that is established, wherein the access claim includes the updated specific attributes and the identifier for the common attributes.

10. The non-transitory computer-readable medium of claim 9, wherein the access claim is a pre-defined response from the computing system that includes: (i) a portion of the session information including the specific attributes, and (ii) the identifier for the common attributes.

11. The non-transitory computer-readable medium of claim 10, wherein the pre-defined response further includes an access token, and wherein the another request for access to the another resource includes the access token sent in the response to the client device.

* * * * *

UNITED STATES PATENT AND TRADEMARK OFFICE
CERTIFICATE OF CORRECTION

PATENT NO. : 10,454,936 B2  
APPLICATION NO. : 15/331613  
DATED : October 22, 2019  
INVENTOR(S) : Koottayi et al.

Page 1 of 1

It is certified that error appears in the above-identified patent and that said Letters Patent is hereby corrected as shown below:

On the Title Page

On page 3, Column 1, under Other Publications, Line 2, delete "Communicaton" and insert -- Communication --, therefor.

In the Specification

In Column 3, Line 27, delete "may by" and insert -- may be --, therefor.

In the Claims

In Column 35, Line 10, in Claim 6, delete "to a" and insert -- to --, therefor.

In Column 36, Line 24, in Claim 9, delete "to a" and insert -- to --, therefor.

Signed and Sealed this  
Sixteenth Day of February, 2021

Drew Hirshfeld  
*Performing the Functions and Duties of the*  
*Under Secretary of Commerce for Intellectual Property and*  
*Director of the United States Patent and Trademark Office*